US012812351B2

(12) United States Patent
Purkayastha et al.

(10) Patent No.: US 12,812,351 B2
(45) Date of Patent: Nov. 24, 2026

(54) DISCOVERY AND INTEROPERATION OF CONSTRAINED DEVICES WITH MEC PLATFORM DEPLOYED IN MNOS EDGE COMPUTING INFRASTRUCTURE

(71) Applicant: InterDigital Patent Holdings, Inc., Wilmington, DE (US)

(72) Inventors: Debashish Purkayastha, Collegeville, PA (US); Robert Gazda, Spring City, PA (US); Shalini Choudhury, Highland Park, NJ (US); Carlos Jesus Bernardos, Alcorcon (ES); Antonio de la Oliva, Madrid (ES); Alain Mourad, Ascot (GB)

(73) Assignee: InterDigital Patent Holdings, Inc., Wilmington, DE (US)

( * ) Notice: Subject to any disclaimer, the term of this patent is extended or adjusted under 35 U.S.C. 154(b) by 287 days.

(21) Appl. No.: 18/285,614

(22) PCT Filed: Apr. 12, 2022

(86) PCT No.: PCT/US2022/024479
§ 371 (c)(1),
(2) Date: Oct. 4, 2023

(87) PCT Pub. No.: WO2022/221321
PCT Pub. Date: Oct. 20, 2022

(65) Prior Publication Data
US 2024/0196184 A1 Jun. 13, 2024

Related U.S. Application Data

(60) Provisional application No. 63/173,837, filed on Apr. 12, 2021.

(51) Int. Cl.
*H04W 8/00* (2009.01)
*H04W 92/18* (2009.01)

(52) U.S. Cl.
CPC ............ *H04W 8/005* (2013.01); *H04W 92/18* (2013.01)

(58) Field of Classification Search
CPC ............................ H04W 28/005; H04W 92/18
See application file for complete search history.

(56) References Cited

U.S. PATENT DOCUMENTS 11,758,327 B2 * 9/2023 Kallai ..................... G06F 3/165 381/107
12,047,986 B2 * 7/2024 Sabella ............... H04L 41/0853
(Continued)

FOREIGN PATENT DOCUMENTS

CN 117322131 A * 12/2023 ............ H04W 8/005
WO 2018/071517 A1 4/2018
(Continued)

OTHER PUBLICATIONS

European Telecommunication Standards Institute (ETSI), GR MEc 035 V2.0.17, "Multi-Access Edge Computing (MEC), Study on Inter-MEC Systems and MEC-Cloud Systems Coordination", Mar. 31, 2021, pp. 1-53.
(Continued)

*Primary Examiner* — Shean Tokuta
(74) *Attorney, Agent, or Firm* — Condo Roccia Koptiw LLP

(57) ABSTRACT

In examples, a function (e.g., local federation (LF)) may be used in Edge Multi-access Edge Computing (EMEC) and Constrained Multi-access Edge Computing (CMEC) to discover available applications in EMEC and CMEC. The function may be referred to as LFE, for example, if used in EMEC. The function may be referred to as LFC, for example, if used in CMEC. In examples, one or more interfaces may be used between LF entities in EMEC and CMEC, for example, to discover applications. In examples, the interfaces may be referred to as Mpp-lfe and Mpp-cmec.

(Continued)

Systems, methods, and/or instrumentalities for one or more of the following may be described herein: EMEC initiated discovery of one or more applications in CMEC, CMEC initiated registration with EMEC to announce availability of application(s), or CMEC initiated discovery of other CMEC application(s).

14 Claims, 20 Drawing Sheets

(56) References Cited

U.S. PATENT DOCUMENTS

| | | | | |
|---|---|---|---|---|
| 12,082,089 | B2 * | 9/2024 | Chen | H04L 41/0895 |
| 2012/0110116 | A1 * | 5/2012 | Rubio | H04W 4/50 709/217 |
| 2017/0034688 | A1 | 2/2017 | Kim et al. | |
| 2020/0228880 | A1 * | 7/2020 | Iyer | H04N 21/23418 |
| 2020/0374954 | A1 * | 11/2020 | Chen | H04W 12/50 |
| 2020/0383157 | A1 * | 12/2020 | Lee | G01S 13/765 |
| 2021/0119962 | A1 * | 4/2021 | Ramia | H04L 65/1016 |
| 2021/0144057 | A1 * | 5/2021 | Giust | H04L 41/0806 |
| 2021/0307018 | A1 * | 9/2021 | Qaisrani | H04W 4/50 |
| 2021/0385865 | A1 * | 12/2021 | Mueck | H04W 4/40 |
| 2022/0086218 | A1 * | 3/2022 | Sabella | H04M 15/66 |
| 2022/0167262 | A1 * | 5/2022 | Ding | H04L 67/56 |
| 2023/0164241 | A1 * | 5/2023 | Filippou | H04L 63/08 709/201 |
| 2024/0196184 | A1 * | 6/2024 | Purkayastha | H04W 8/005 |
| 2024/0259772 | A1 * | 8/2024 | Purkayastha | H04L 67/51 |
| 2025/0274527 | A1 * | 8/2025 | Gazda | H04L 67/289 |

FOREIGN PATENT DOCUMENTS

| | | | | |
|---|---|---|---|---|
| WO | WO-2019140221 A1 * | 7/2019 | | H04L 67/10 |
| WO | WO-2019191108 A1 * | 10/2019 | | H04L 1/1874 |
| WO | WO-2019236714 A1 * | 12/2019 | | H04W 72/04 |
| WO | WO-2019242856 A1 * | 12/2019 | | H04L 41/0806 |
| WO | WO-2020013677 A1 * | 1/2020 | | H04W 8/00 |
| WO | 2020/227435 A1 | 11/2020 | | |
| WO | WO-2021067140 A1 * | 4/2021 | | H04W 28/0284 |
| WO | WO-2021236162 A1 * | 11/2021 | | H04W 12/08 |
| WO | WO-2022221321 A1 * | 10/2022 | | H04W 92/18 |
| WO | WO-2022245796 A1 * | 11/2022 | | H04L 67/51 |
| WO | WO-2022261098 A1 * | 12/2022 | | H04L 67/1001 |

OTHER PUBLICATIONS

3rd Generation Partnership Project (3GPP), R1-135269, "D2D Discovery Resource Allocation Under Network Coverage", NEC, 3GPP TSG RAN WG1 Meeting #75, San Francisco, USA, Nov. 11-15, 2013, 6 pages.

3rd Generation Partnership Project (3GPP), CP-203217, "CR pack on V2XAPP #2", CT1, 3GPP TSG-CT Meeting #90e, E-Meeting, Dec 6-8, 2020, 2 pages.

European Telecommunication Standards Institute (ETSI), GR MEC 035 V3.1.1, "Multi-Access Edge Computing (MEC), Study on Inter-MEC Systems and MEC-Cloud Systems Coordination", Jun. 2021, pp. 1-52.

European Telecommunications Standards Institute (ETSI), GR MEC 036 V3.0.3, "Multi-Access Edge Computing (MEC), Study on MEC in Resource Constrained Terminals, Fixed or Mobile", Oct. 2010.

European Telecommunications Standards Institute (ETSI) GS MEC 003 V2.1.1, "Multi-access Edge Computing (MEC), Framework and Reference Architecture", Jan. 2019, pp. 1-21.

European Telecommunications Standards Institute (ETSI) GS MEC 013 V2.1.1, "Multi-access Edge Computing (MEC), Location API", Sep. 2019, pp. 1-39.

European Telecommunications Standards Institute (ETSI) GS MEC 016 V2.2.1, "Multi-access Edge Computing (MEC), Device Application Interface", Apr. 2020, pp. 1-28.

European Telecommunications Standards Institute (ETSI) GS MEC 028 V2.1.1, "Multi-access Edge Computing (MEC), WLAN Information API", Jun. 2020, pp. 1-46.

Kekki et al., "MEC in 5G Networks", ETSI White Paper No. 28, First edition, Jun. 2018, pp. 1-28.

* cited by examiner

DISCOVERY AND INTEROPERATION OF CONSTRAINED DEVICES WITH MEC PLATFORM DEPLOYED IN MNOS EDGE COMPUTING INFRASTRUCTURE

CROSS-REFERENCE TO RELATED APPLICATIONS

This application is the National Stage entry under 35 U.S.C. § 371 of Patent Cooperation Treaty Application PCT/US2022/024479, filed Apr. 12, 2022, which claims the benefit of U.S. Provisional Patent Application No. 63/173,837, filed Apr. 12, 2021, the contents of which are hereby incorporated by reference herein.

BACKGROUND

Mobile communications using wireless communication continue to evolve. A fifth generation of mobile communication radio access technology (RAT) may be referred to as 5G new radio (NR). A previous (legacy) generation of mobile communication RAT may be, for example, fourth generation (4G) long term evolution (LTE).

SUMMARY

In examples, a device implementing a function (e.g., local federation (LF)) may be used in edge multi-access edge computing (EMEC) and constrained multi-access edge computing (CMEC) to discover available applications in EMEC and CMEC. The function may be referred to as LFE, for example, if used in EMEC. The function may be referred to as LFC, for example, if used in CMEC.

In examples, one or more interfaces may be used between LF entities in EMEC and CMEC, for example, to discover applications. In examples, the interfaces may be referred to as Mpp-lfe and Mpp-cmec.

Systems, methods, and/or instrumentalities for one or more of the following may be described herein: EMEC initiated discovery of one or more applications in CMEC, CMEC initiated registration with EMEC to announce availability of application(s), or CMEC initiated discovery of other CMEC application(s).

A method and/or a first wireless transmit/receive unit (WTRU) may be provided. The first WTRU may comprise a processor. A first message may be received from the network. The first message may indicate communication information that may be used to communicate to a second WTRU. A second message may be sent to the second WTRU. The second message may be based on the communication information. The second message may indicate a discovery service request. A third message may be received from the second WTRU. The third message may indicate a service provided by the second WTRU. The third message may indicate an identifier associated with the service. A fourth message may be sent to the second WTRU using the identifier. The fourth message may include data for the service.

A method and/or a first wireless transmit/receive unit (WTRU) may be provided. The first WTRU may comprise a processor. A first message may be received from the network. The first message may indicate communication information that may be used to communicate to a second WTRU. A second message may be sent to the second WTRU. The second message may be based on the communication information. The second message may indicate a discovery service request. A third message may be received from the second WTRU. The third message may indicate a service provided by the second WTRU. The third message may indicate an identifier associated with the service.

The features and elements described herein may be used alone, without the other features and elements, or in various combinations with one or more of the other features and elements.

DETAILED DESCRIPTION

Figure 1A:
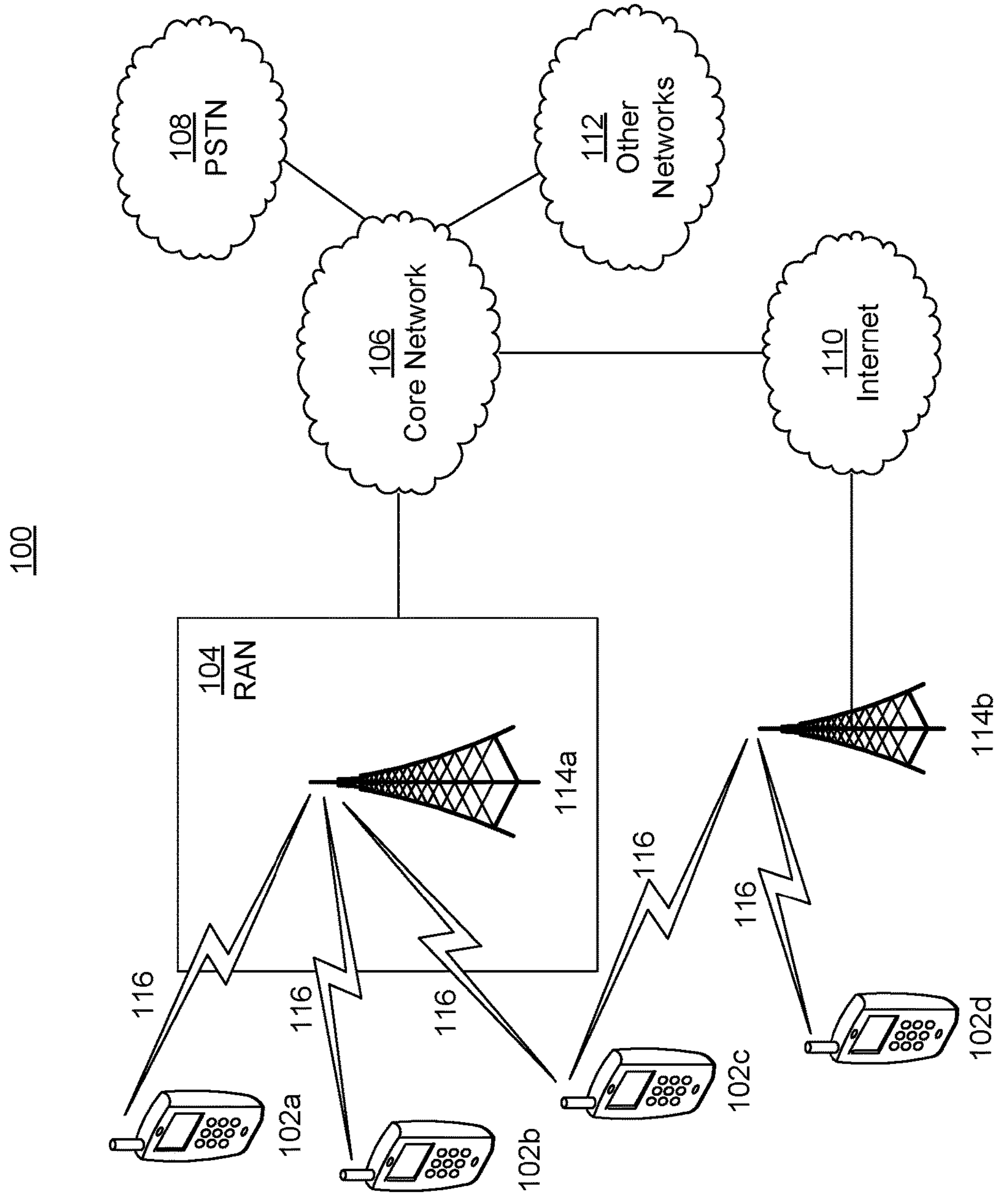
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106/115, the Internet 110, and/or the other networks 112. By way of example, the base stations 114*a*, 114*b* may be a base transceiver station (BTS), a Node-B, an eNode B, a Home Node B, a Home eNode B, a gNB, a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station

114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using Previously Presented Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN).

In an embodiment, the base station **114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115**.

The RAN 104/113 may be in communication with the CN 106/115, which may be any type of network configured to provide voice, data, applications, and/or voice over internet protocol (VoIP) services to one or more of the WTRUs **102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115** may also be in communication with another RAN (not shown) employing a GSM, UMTS, CDMA 2000, WiMAX, E-UTRA, or WiFi radio technology.

The CN 106/115 may also serve as a gateway for the WTRUs **102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113** or a different RAT.

Some or all of the WTRUs **102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b***, which may employ an IEEE 802 radio technology.

Figure 1B:
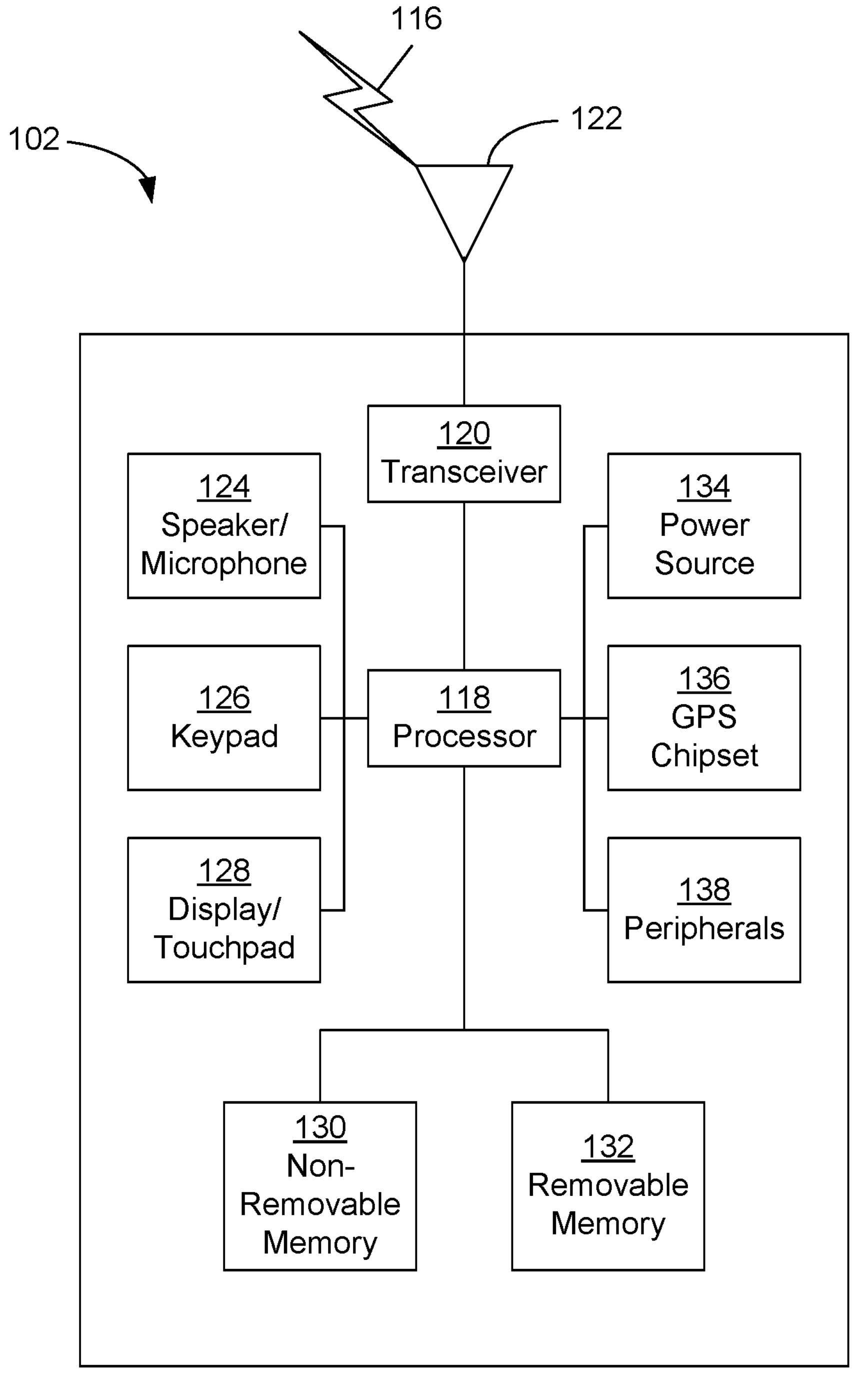
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station **114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122** may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
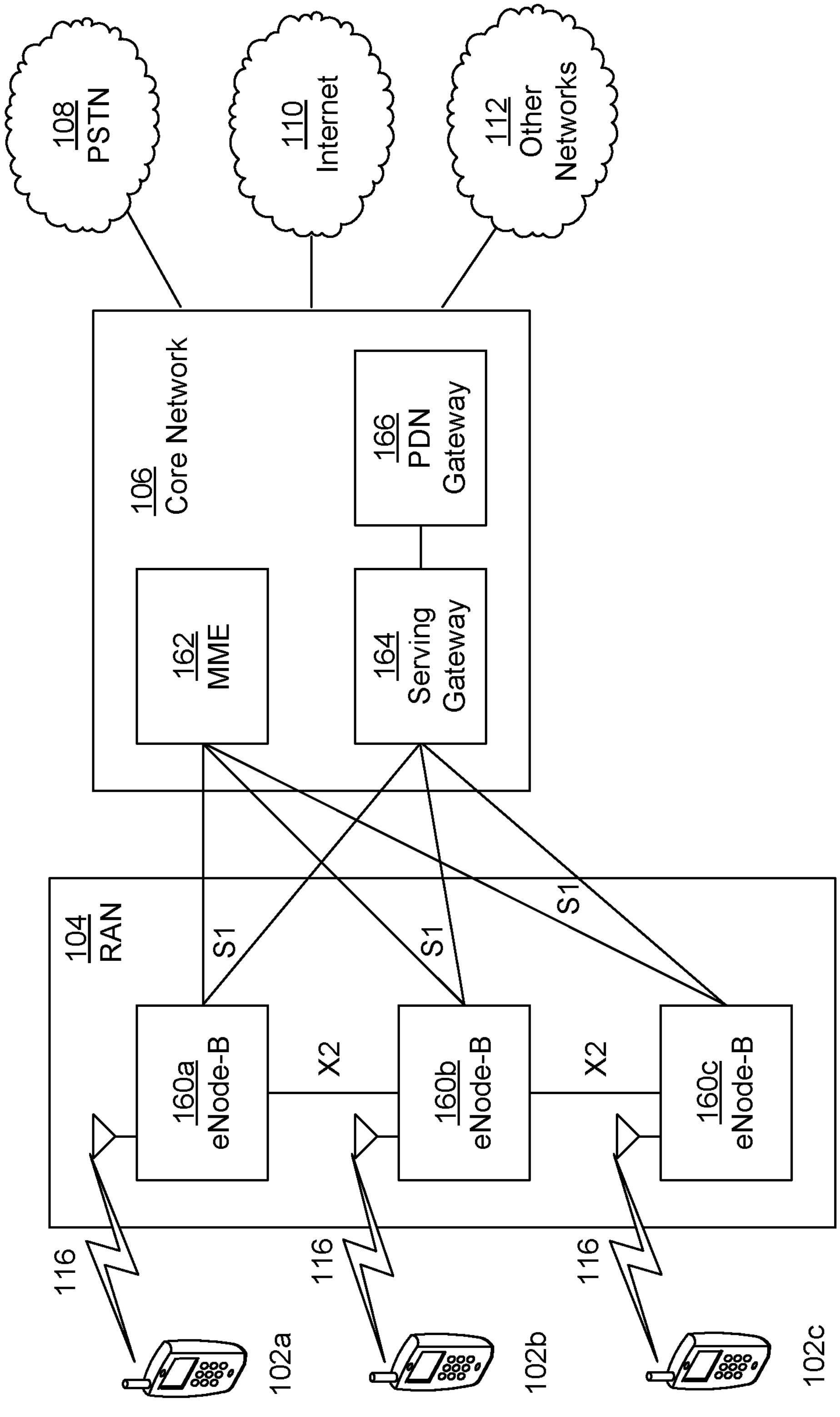
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
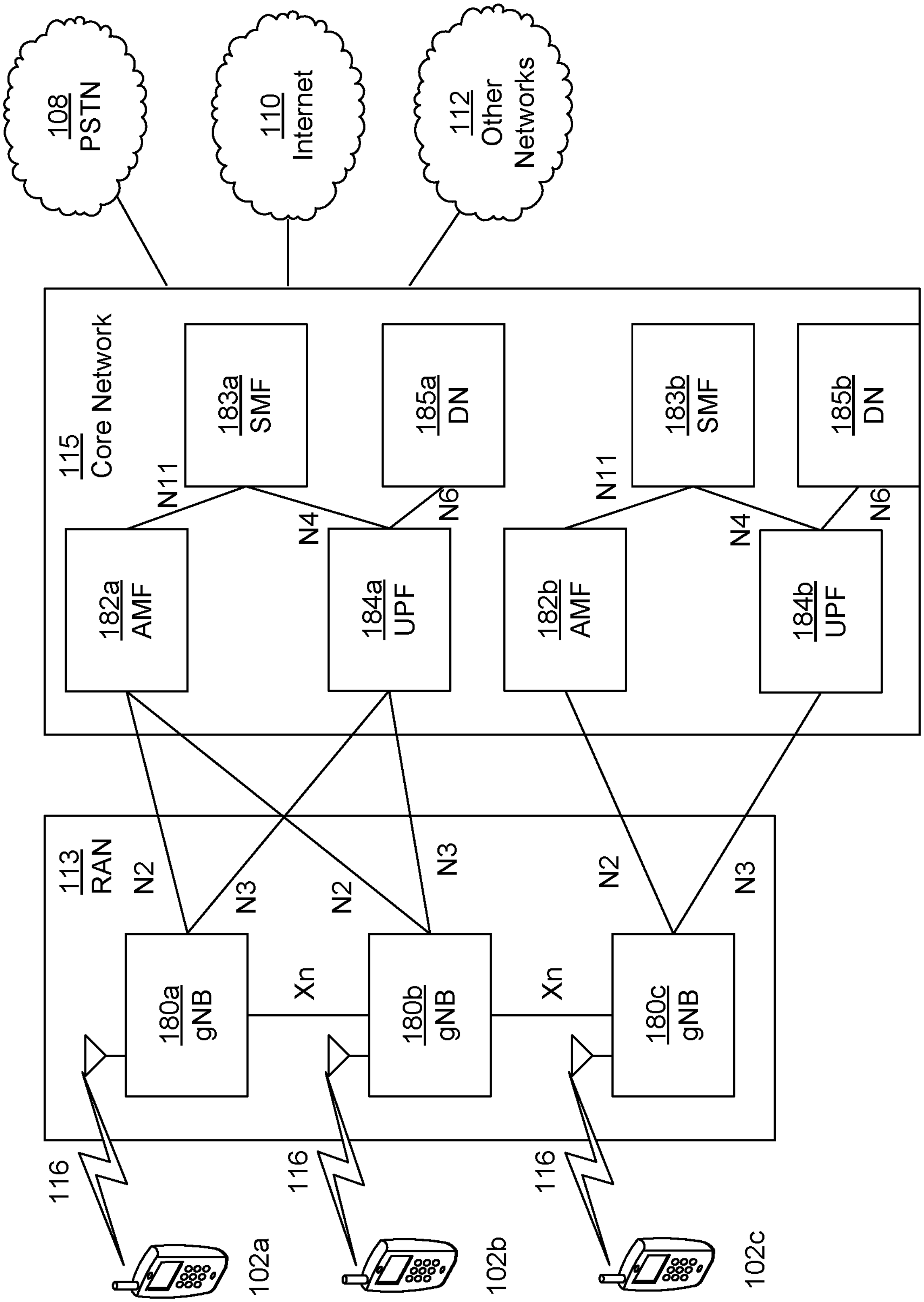
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In examples, a device implementing a function (e.g., local federation (LF) may be used in edge multi-access edge computing (EMEC) and/or constrained multi-access edge computing (CMEC) to discover available applications in EMEC and/or CMEC. The function may be referred to as LFE, for example, if used in EMEC. The function may be referred to as LFC, for example, if used in CMEC.

In examples, one or more interfaces may be used between LF entities in EMEC and CMEC, for example, to discover applications. In examples, the interfaces may be referred to as Mpp-lfe and Mpp-cmec.

Systems, methods, and/or instrumentalities for one or more of the following may be described herein: EMEC-initiated discovery of one or more applications in CME, CMEC-initiated registration with EMEC to announce availability of application(s), or CMEC-initiated discovery of other CMEC application(s).

A method and/or a first wireless transmit/receive unit (WTRU) may be provided. The first WTRU may comprise a processor. A first message may be received from the network. The first message may indicate communication information that may be used to communicate to a second WTRU. A second message may be sent to the second WTRU. The second message may be based on the communication information. The second message may indicate a discovery service request. A third message may be received from the second WTRU. The third message may indicate a service provided by the second WTRU. The third message may indicate an identifier associated with the service. A fourth message may be sent to the second WTRU using the identifier. The fourth message may include data for the service.

In an example, the communication information may be based on registration information associated with the second WTRU.

In an example the identifier may be used to access the service. The identifier may be a uniform resource identifier (URI).

In an example, the list may be generated of available WTRUs using the first message. The list of available WTRUs may be associated with the communication information. The list of available WTRUs may include the second WTRU.

In an example, a fifth message may be sent to a third WTRU. The list of available WTRUs may include the third WTRU. The fifth message may indicate the second WTRU and/or the communication information.

In an example, the location of the first WTRU and the location of the second WTRU may be determined. In an example, the location of the first WTRU and/or the location of the second WTRU may be associated with a geographic area.

In example, the first WTRU may be associated with an Edge Multi-access Edge Computing (EMEC) system, and wherein the second WTRU is associated with a Constrained Multi-access Edge Computing System (CMEC).

A method and/or a first wireless transmit/receive unit (WTRU) may be provided. The first WTRU may comprise a processor. A first message may be received from the network. The first message may indicate communication information that may be used to communicate to a second WTRU. A second message may be sent to the second WTRU. The second message may be based on the communication information. The second message may indicate a discovery service request. A third message may be received from the second WTRU. The third message may indicate a service provided by the second WTRU. The third message may indicate an identifier associated with the service.

In an example, a fourth message may be sent to the second WTRU using the identifier. The fourth message may include data for the service.

In an example, the communication information may be based on registration information associated with the second WTRU.

In an example the identifier may be used to access the service. The identifier may be a uniform resource identifier (URI).

In an example, the list may be generated of available WTRUs using the first message. The list of available WTRUs may be associated with the communication information. The list of available WTRUs may include the second WTRU.

In an example, a fifth message may be sent to a third WTRU. The list of available WTRUs may include the third WTRU. The fifth message may indicate the second WTRU and/or the communication information.

In an example, the location of the first WTRU and the location of the second WTRU may be determined. In an example, the location of the first WTRU and/or the location of the second WTRU may be associated with a geographic area.

In example, the first WTRU may be associated with an Edge Multi-access Edge Computing (EMEC) system, and wherein the second WTRU is associated with a Constrained Multi-access Edge Computing System (CMEC).

Figure 2:
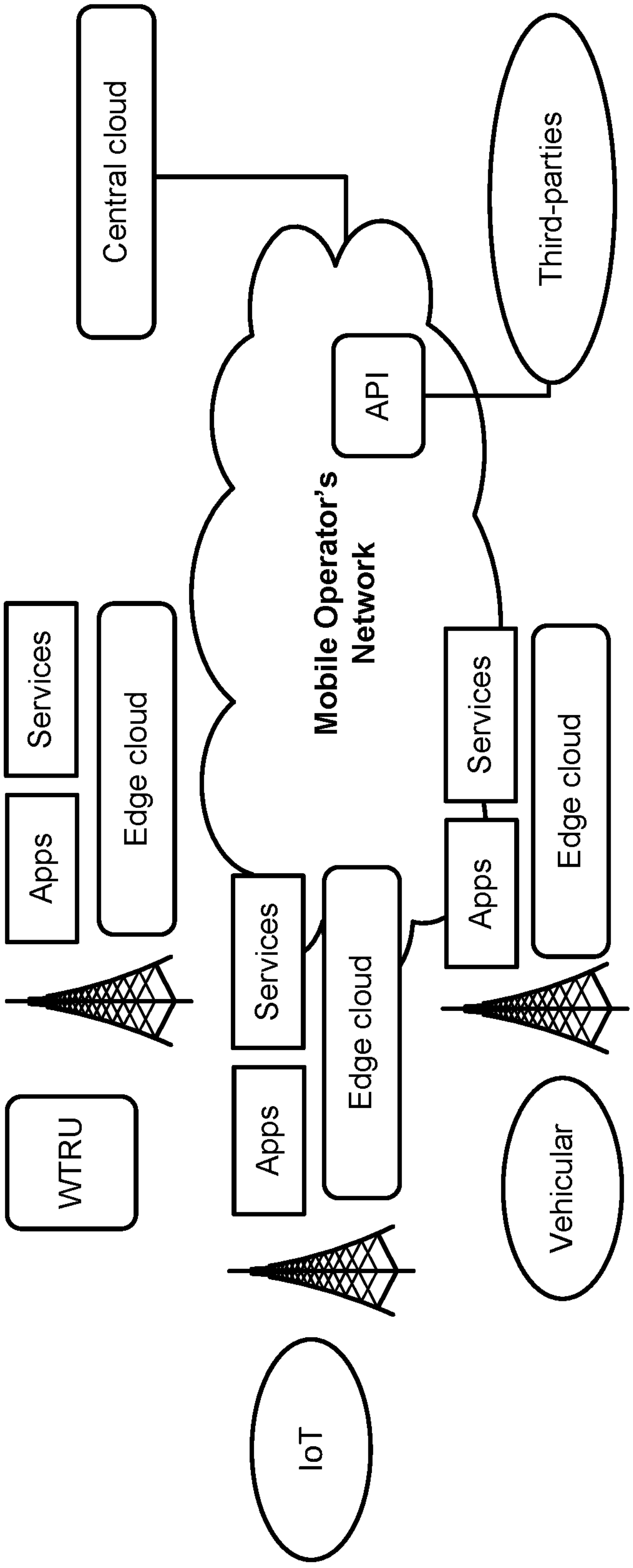
FIG. 2 is a diagram showing an example Multi-access Edge Computing (MEC).

FIG. 2 is a diagram showing an example multi-access edge computing (MEC). In examples, multi-access edge computing (e.g., additionally known as mobile edge computing) capabilities deployed in the edge of a mobile network may facilitate efficient and dynamic provision of services to mobile users. An environment (e.g., open environment) may be used for integrating MEC capabilities with service providers' networks, for example, including applications from third-parties (e.g., as shown in FIG. 2). Distributed computing capabilities may make available IT infrastructure, for example, as in a cloud environment for the deployment of functions in mobile access networks.

For example, a function may refer to and/or represent a software module that implements the operation and/or interfaces associated with the function. For example, the module may be an independent module. The module may be deployed independently of other modules (e.g., other functions). The module may be modified independently of other modules (e.g., other functions). The module may be disabled independently of other modules (e.g., other functions).

The module may be operated in a computing platform (e.g., any appropriate computing platform). For example, the module may be operated on dedicated hardware. The module may be operated on a virtual machine. The module may be operated in a cloud environment.

The interfaces between modules may be operated over a mechanism (e.g., any mechanism) suitable for the communication of information between modules. For example, interfaces may send and/or receive messages (e.g., structured information) sent over a network. For example, interfaces may send and/or receive messages (e.g., structured information) sent within a computing platform (e.g., the computing platform may host both the sending and receiving modules). The messages may include parameters in software application programming interface (API), for example.

Figure 3:
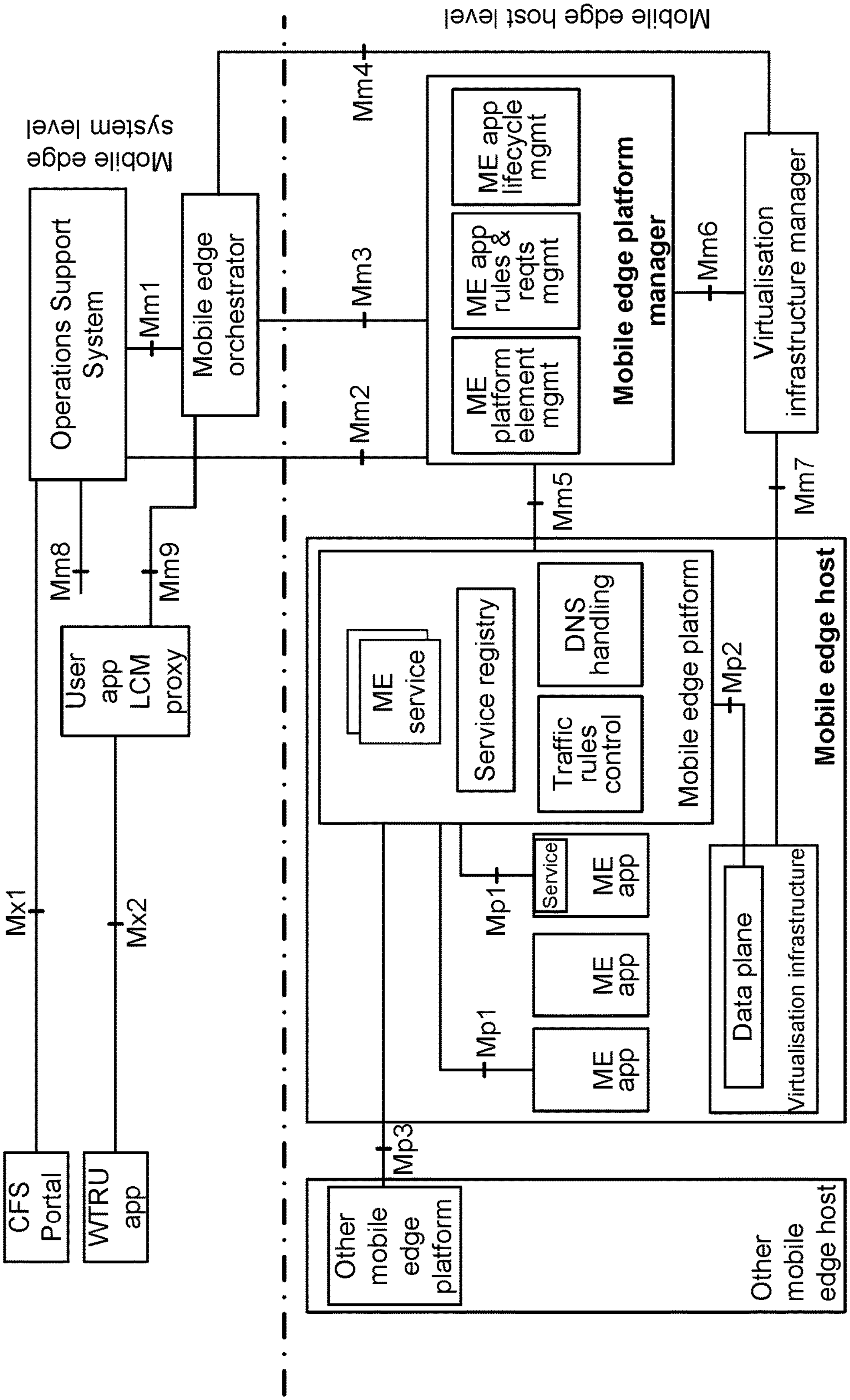
FIG. 3 is a diagram showing an example MEC architecture.

FIG. 3 is a diagram showing an example MEC architecture. In examples, the MEC reference architecture may include functional elements that comprise a mobile edge system and/or reference points between the functional elements as shown FIG. 3.

There may be groups (e.g., three groups) of reference points defined between system entities: reference points regarding mobile edge platform functionality (e.g., referred to as MP), management reference points (e.g., referred to as Mm), and/or reference points connecting to external entities (e.g., referred to as Mx).

The mobile edge system may comprise one or more mobile edge hosts and/or mobile edge management used to run mobile edge application(s) within an operator network or a subset of an operator network. In examples, a mobile edge host may be an entity that includes a mobile edge platform and/or a virtualization infrastructure, for example, which may provide compute, storage, and/or network resources for running mobile edge applications. The mobile edge platform may be a collection of functionalities (e.g., essential functionalities) to run mobile edge applications on a virtualization infrastructure (e.g., a particular virtualization infrastructure) and/or may enable the mobile edge applications to provide and/or consume mobile edge services. Mobile edge applications may be instantiated on the virtualization infrastructure of the mobile edge host, for example, based on configuration requests validated by the mobile edge management.

Mobile edge management may comprise a mobile edge system level management and/or mobile edge host level management. In examples, the mobile edge system level management may include a mobile edge orchestrator as its core component which may comprise an overview of the mobile edge system (e.g., the complete mobile edge system). The mobile edge host level management may comprise a mobile edge platform manager and/or a virtualization infrastructure manager. The mobile edge host level management may handle management of mobile edge functionality (e.g., mobile edge specific functionality) of a particular mobile edge host and/or the applications running on the particular mobile edge host.

Inter-MEC communication may be provided. MEC specifications may apply to inter-MEC systems and/or MEC-Cloud systems coordination that may support, for example, application instance relocation, synchronization, and/or MEC federation. Enablement and/or enhancement of functionalities for application lifecycle management by third-parties (e.g., application developers) may be provided.

MEC federation may comprise federation manager modules, which may be in charge of communication among MEC systems and may be responsible for providing a list of functionalities for MEC platform discovery (e.g., for the needs of MEC platform discovery). As part of the operation of a MEC federation, the following inter-MEC system communication level may be introduced, for example, after MEC system discovery and/or MEC platform discovery: information exchange at MEC platform and/or higher level for MEC service consumption (e.g., for the needs of MEC service consumption) and/or for MEC app-to-app communication.

Figure 4:
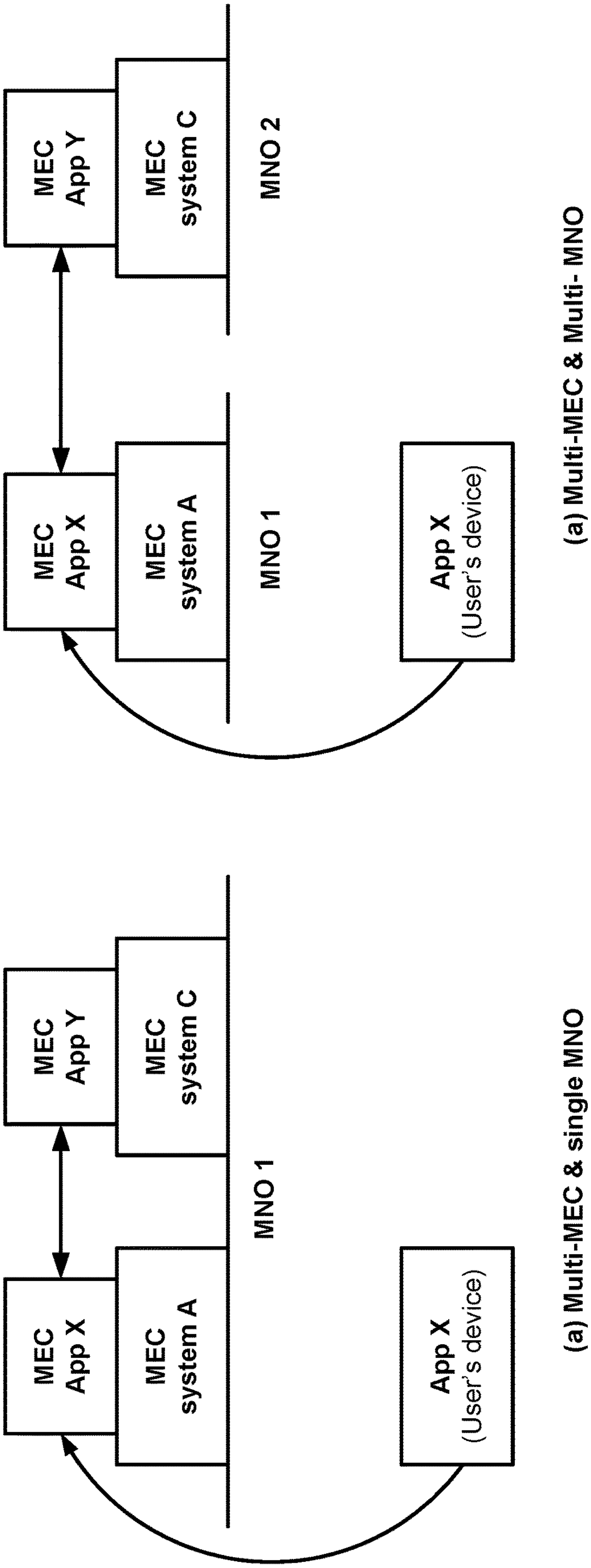
FIG. 4 is a diagram showing an example inter-MEC use case.

FIG. 4 is a diagram showing an example inter-MEC use case. In examples, communication may be between different MEC applications (Apps) in a multi-MEC environment over a single or multiple Mobile network operator(s) (MNO(s)).

There may be a limitation in providing interactive augmented reality (AR) application with users connected to different MNOs, for example, without using a MEC federation. The limitation may be due to the users of different MNOs not being able join the multiplayer interactive AR game. Examples may provide interactive AR application where users may be connected to different MNOs.

Figure 5A:
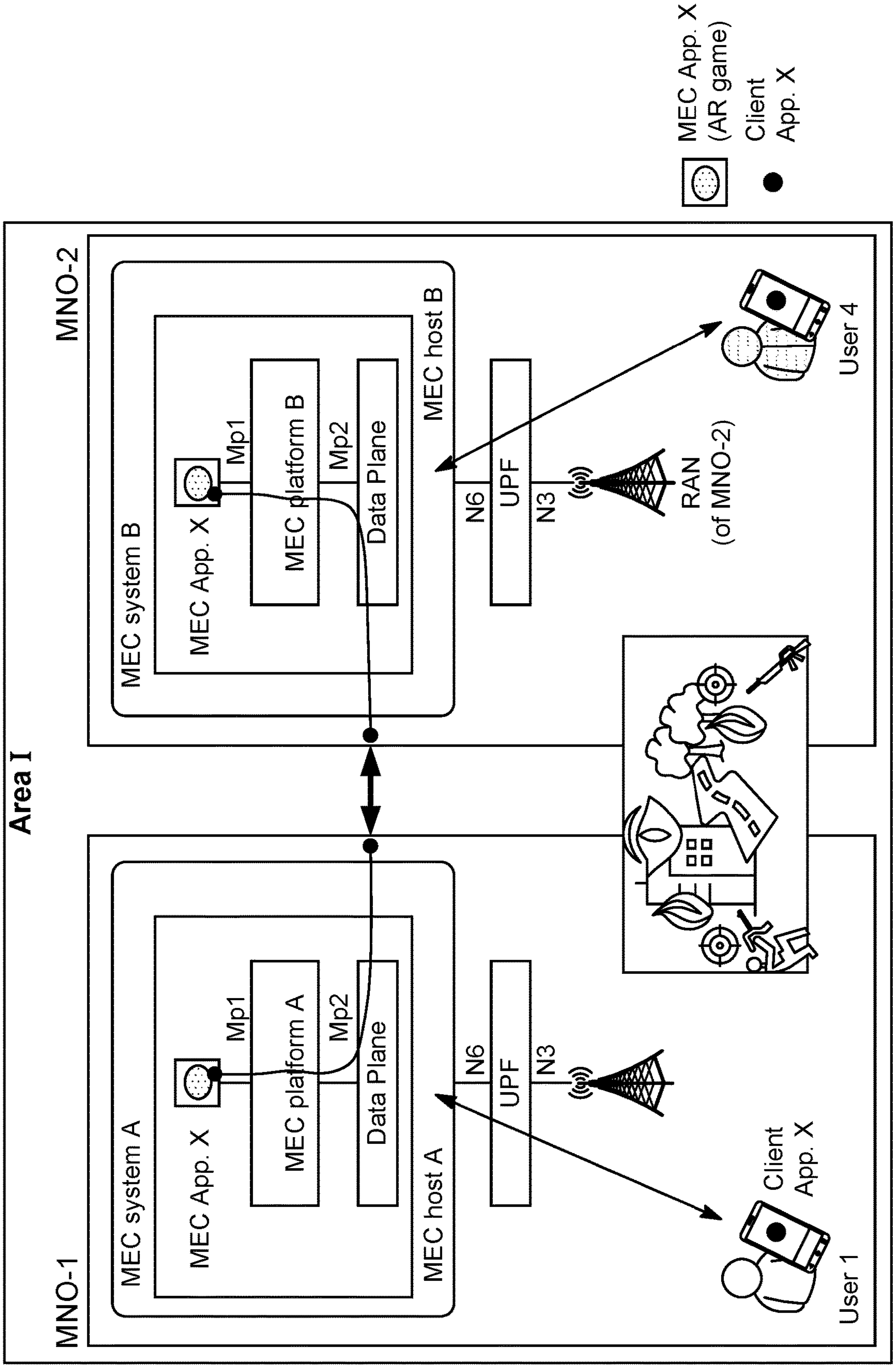
FIG. 5A shows a diagram of an example Virtual Reality and/or Augmented Reality (VR/AR) use case.

FIG. 5A shows a diagram of an example AR/VR use case. For example, an AR game MEC app may have X instances (e.g., two AR game MEC app X instances) and may coordinate for real-time synchronization. An IP network (e.g., a direct IP network) may exist between associated MEC systems owned and/or operated by different MNOs, for example, following an MNO agreement. The AR/VR use case (e.g., described in FIG. 5A) may align (e.g., align well) with use cases where there may be a request for low manufacturing defects (e.g., zero manufacturing defects) in a smart factory and/or a massive multi-player online gaming. MEC application X instances may be available on MEC hosts of MEC system A and/or MEC system B and the instances may communicate and/or coordinate to one another for synchronizing the application, for example, similar to the game scenario or smart factory manufacturing scenario.

The AR/VR use case (e.g., described in FIG. 5A) may involve enabling a MEC application instance to discover another MEC application instance (e.g., of the same application) in the same or different MEC system. An example may include (e.g., subject to the agreement of the involved parties such as operators and/or App providers)) supporting on-boarding and/or instantiation of a MEC application in a MEC system in response to a request with a key performance indicator (e.g., latency) by another MEC system.

The MEC application X instantiated on MEC host A may transfer multiplayer room information to other MEC application X instance(s) on other MEC hosts within the MEC federation (e.g., shown as MEC host B in FIG. 5A), for example, considering the multi-player gaming use case. A desired user (e.g., shown as user 4 in FIG. 5A) may enjoy the multiplayer game by entering the multiplayer game room, for example, if the user connects to the game server (e.g., a MEC application X running on MEC host B.)

Figure 5B:
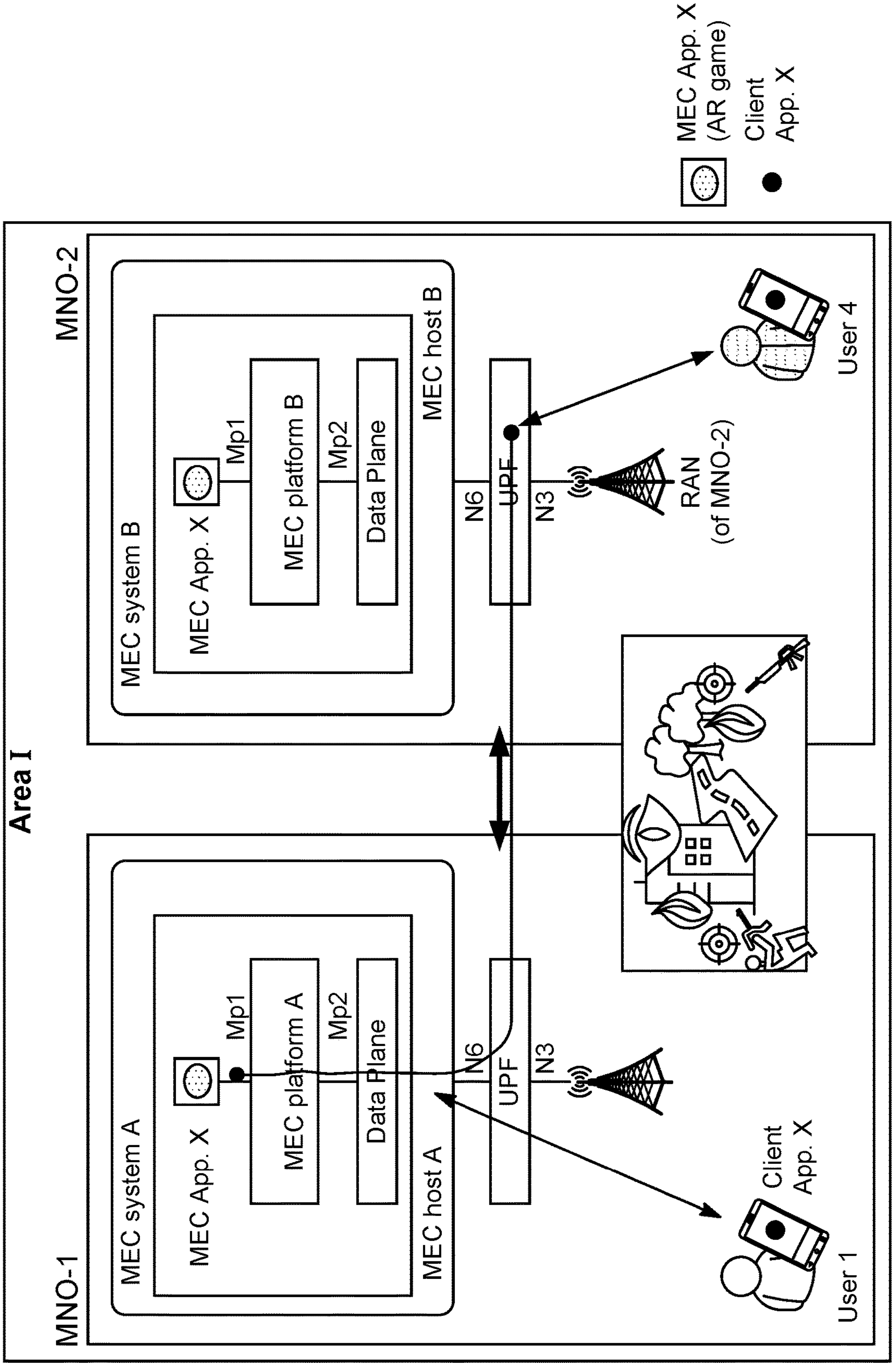
FIG. 5B shows a diagram of an example AR/VR use case.

FIG. 5B shows a diagram of an example AR/VR use case. For example, MEC platform B may switch traffic from user 4 for MEC app X to MEC platform A. A direct IP network may exist between the UPFs of different MNOs within the MEC federation, for example, following an MNO agreement.

In the AR/VR use case (e.g., described in FIG. 5B) the main application instance may remain in MEC host A in MNO-1, for example, which may be contrary to the AR/VR use case described in FIG. 5A. User 1 (e.g., in FIG. 5B) may decide where the multiplayer game room will be created following a centralized approach (e.g., a more centralized approach). The MEC application X running on MEC host B may set a traffic rule (e.g., may need to set a traffic rule), for example, so that the traffic from user 4 to the MEC application X may be switched to the main MEC application X instance (e.g., the one running on MEC host A in this case). Both user 1 and user 4 may enjoy the multiplayer mode, for example, while being served by MEC application X running on MEC host A.

There may be an IP network (e.g., a direct IP network) between the UPFs of different MNOs within the MEC federation, for example, following an MNO agreement. In case of disruption in connectivity with the MEC host A, one or more players connected via other MNOs (e.g., MNO 2) may be unable to continue the gaming service.

Triangular routing may be where traffic may be routed (e.g., constantly routed) via a home-network may occur. For example, if a player has joined the online gaming from another MNO, the traffic may be steered (e.g., continuously being steered) through the main application instance hosted in MNO-1 (e.g., especially when the original application instance is hosted in an MNO far away from the players currently connected MNO.) This approach may be increase latency (e.g., may be latency intensive) and may not be suitable for real-time use cases (e.g., multiplayer online gaming and/or zero manufacturing defect).

Figure 6:
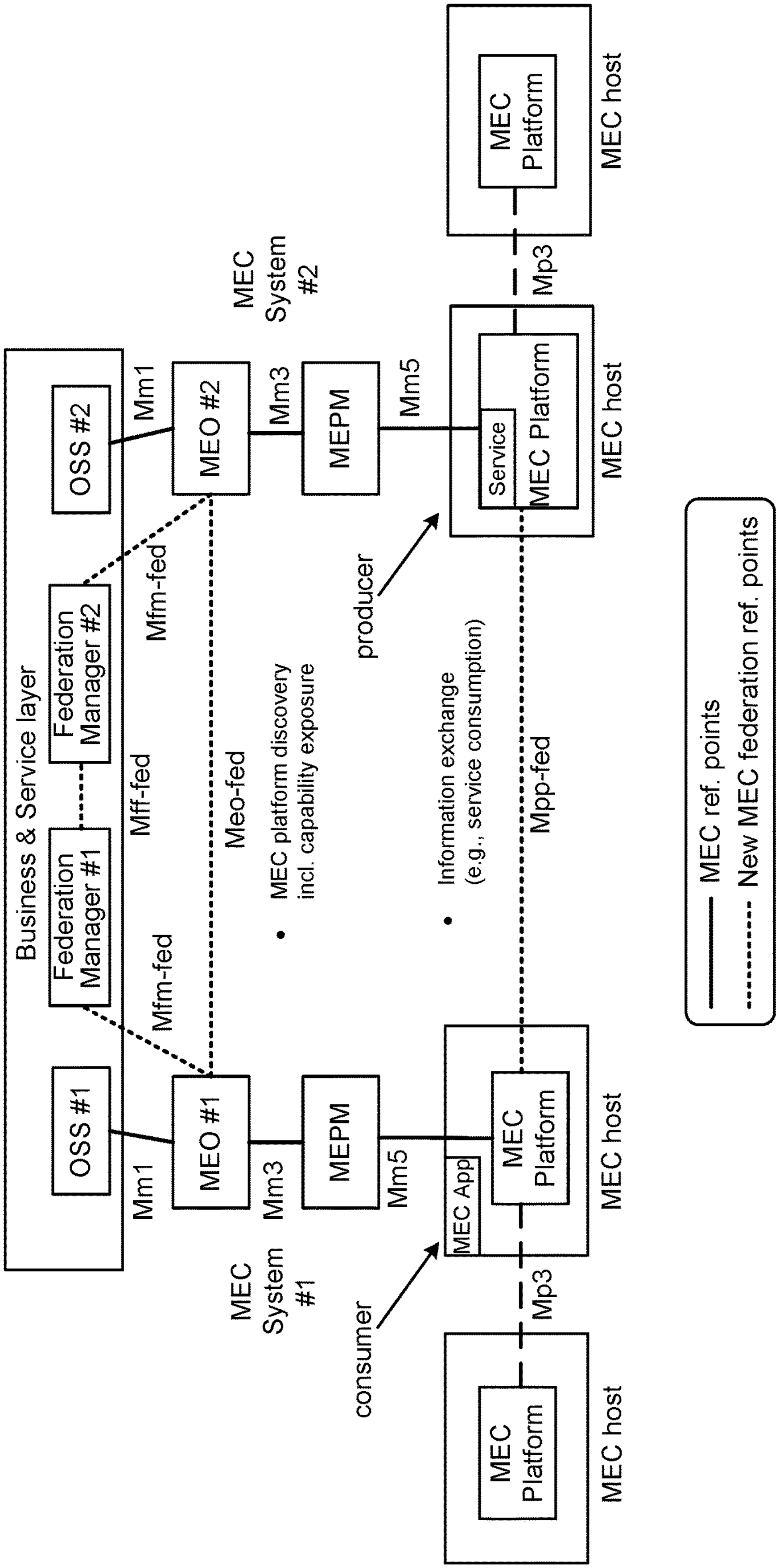
FIG. 6 is a diagram showing example MEC federation reference points.

FIG. 6 is a diagram showing example MEC federation reference points. In examples, multiple federation managers may interact via a Mff-fed reference point (e.g., a dedicated Mff-fed reference point). Processes for discovering another MEC system and its MEC platforms may be handled via MEC federation entities, for example, to facilitate inter-MEC system information exchange towards MEC service consumption and/or MEC app-to-app communication. Control signals (e.g., all control signals) between MEC systems to establish (e.g., needed to establish) a MEC federation may be exchanged via the federation management entities. The federation manager may send a request to one or more connected MEC orchestrators (MEO) s to identify an MEC platform (e.g., an appropriate MEC platform), for example, if the federation manager does not have enough information to identify the requested service.

A Mpp-fed reference point (e.g., connecting inter-system MEC platforms) may allow edge service consumption in a MEC federation (e.g., in MEC federation scenarios). Service consumption may be provided (e.g., in the context of a MEC federation) with an addition of an Mpp-fed reference point and/or another option that may enhance a Mp3 reference point. For example, the Mp3 reference point may be improved with signaling capability among MEC platforms belonging to one or more MEC systems.

Meo-fed reference point (e.g., connecting configured MEOs) may enable inter-MEC system platform discovery, for example, including capability exposure. MEO 1 may (e.g., after MEC system discovery) know the identification (ID) of MEO 2 and may communicate with MEO 2 via the Meo-fed reference point by requesting the IDs of the available MEC platforms of MEC system 2 and a list of the MEC platforms' shared services as well as the MEC platforms' authorization and/or access policies.

The signaling/messages for communication among different MEC systems owned by different MNOs may address one or more of the following for information exchanges: for systems to establish a security trust by authenticating and/or authorizing each other; for an application provider to deploy its application across one or more MEC systems using a single MNO relationship and/or integration (e.g., a same northbound interface); or for a MEC application communicating (e.g., in need of communicating) with other MEC applications (e.g., service-producing MEC applications).

Terminal units, mobile hosts, and/or personal devices may be used to support cloud computing at the edge. In an example, there may be a limited availability of compute resources for running MEC application. The limited availability may impact a life cycle management of VMs or other form(s) of virtual instances. In an example, the mobility of constrained terminals may impact the reachability of MEC applications, the maintenance of reasonable connectivity, the device availability, and/or the discovery of appropriate services. In an example, there may be an impact of unavailability of reliable high bandwidth backhaul connectivity (e.g., wired or wireless). In an example, security and/or authorization may be provided to use a constrained terminal and/or privacy of user data and/or applicability of MEC specification to support cloud computing on a constrained environment.

There may be scenarios where enabling a reduced capability MEC platform (e.g., CMEC) for deployment on constrained devices may allow MEC apps to be instantiated on the constrained devices.

Figure 7:
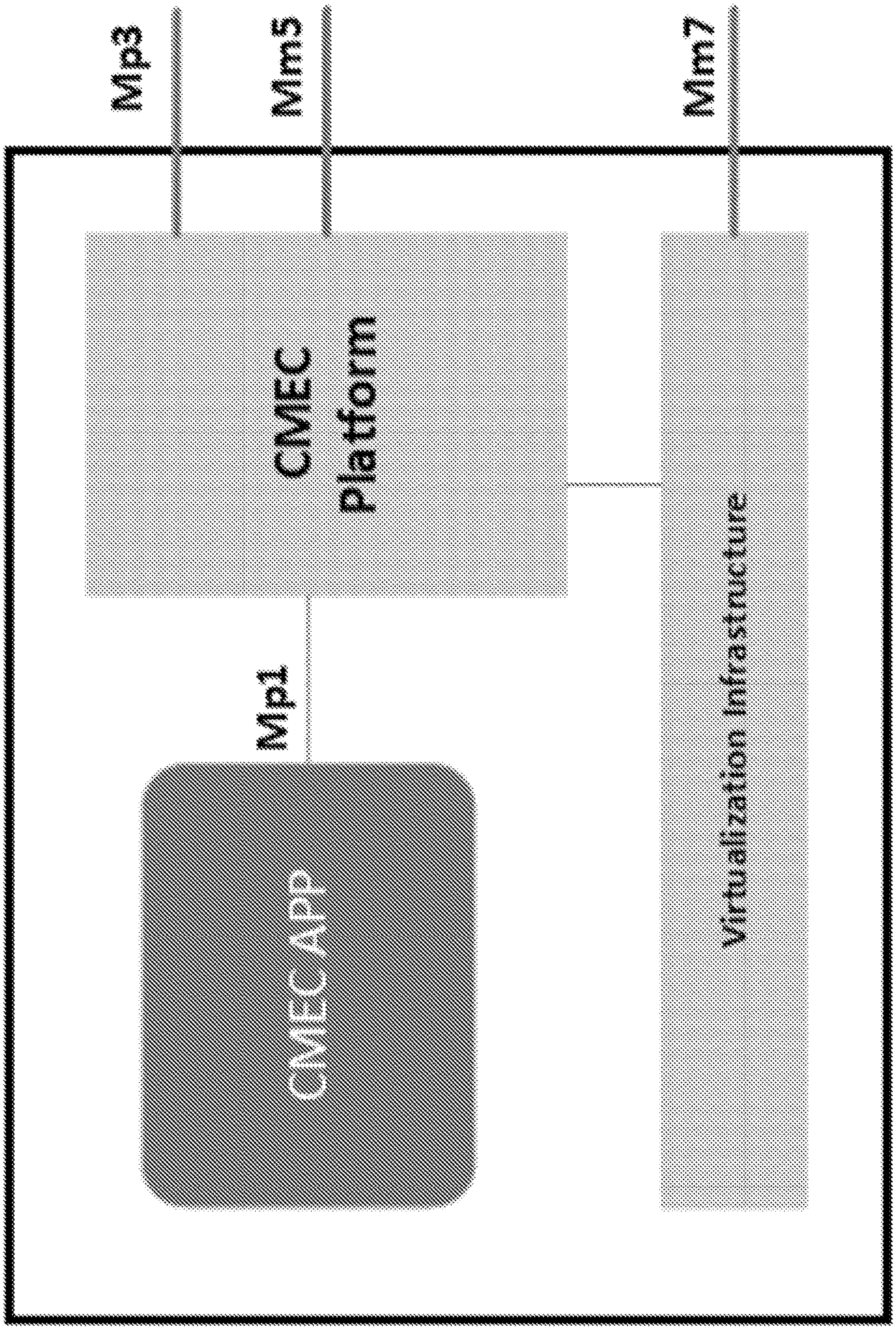
FIG. 7 is a diagram showing example constrained multi-access edge computing (CMEC) host definition.

FIG. 7 is a diagram showing example CMEC host definition. CMEC may include a MEC host (e.g., a CMEC platform) supporting reduced functions and/or features, for example, if compared to a featured telco and/or infrastructure MEC platform (e.g., a full featured telco and/or infrastructure MEC platform). CMEC apps (e.g., which may be the same as MEC apps) may use an Mp1 interface to interact with a CMEC platform. The CMEC host may be referred to as a CMEC device herein. CMEC may be defined as a host without a MEC platform (e.g., any MEC platform). In examples, the CMEC may comprise a virtualization interface (e.g., a general virtualization interface) that may be capable to deploy and/or run one or more MEC applications.

CMEC may support MEC interfaces (e.g., all MEC interfaces) such as Mp1, Mp3, Mm5, and/or Mm7. Mp3/Mm5/Mm7 may not be specified in a standard, such as MEC, and may be open for implementation. An implementer may implement a reduced set of functions, for example, for CMEC. The implementer may not offer MEC services (e.g., all MEC services). For example, radio network information service (RNIS) may be offered while bandwidth management (BWM) may not be offered by the implementer. The implementer may have restriction(s) on the number of services that may be running at a certain instant or duration of time. The implementer may have restrictions on the number of requests the application may handle and may try to save power by going into sleep mode.

There may be multiple use cases that may apply to the deployment scenario described herein, including one or more of the following: vehicular scenarios, for example, where a CMEC embedded in a vehicle may run applications for other neighboring vehicles (e.g., in platooning situations) and/or for the edge network (e.g., for safety and traffic efficiency applications), for example, where mobile robots and/or robot arms may host MEC applications to minimize latency (e.g., required by certain use cases); or home-gaming scenarios, for example, where cloud-based gaming applications using AR/VR may involve (e.g., need) ultra-low latencies and/or extended computational capabilities, which may be provided by CMECs in the same household.

The deployment scenarios describe herein may benefit, for example, if CMEC devices may be allowed to offer MEC services dynamically when the MEC services become part of the larger edge computing infrastructure (e.g., telco edge which may be referred to as edge MEC or EMEC herein and EMEC may be the MEC host at telco edge). In examples, the CMEC devices may be allowed to interoperate and/or share compute resources with telco edge cloud services (e.g., EMEC). Reduced capability devices may be supplied by a third-party and/or purchased by a service provider who wants to integrate with MNOs infrastructure. For example, an in-vehicle MEC may be installed and/or managed by a vehicle manufacturer to be fitted in a vehicle and integrated with MNO's edge computing infrastructure to provide autonomous vehicle services. The dynamic integration of CMEC devices may be managed and/or controlled by MNO or a third-party service provider.

Use cases, e.g., smart factory, massive multi-player online gaming, etc., may include federated learning (FL), which may be a machine learning (ML) technique that trains an algorithm across multiple decentralized CMEC devices involving distributed learning. In the use cases, there may be a requirement for CMEC devices to use services on other CMEC devices in the vicinity. A CMEC may initiate (e.g., may be required to initiate) discovery of MEC services in other CMECs.

For a CMEC platform to interoperate with an MEC platform (e.g., full capability MEC platform) at the Telco Edge (e.g., EMEC), one or more of the following may apply: how to dynamically integrate and/or associate a CMEC node into a MEC system (e.g., a larger MEC system), for example, where the CMEC may be owned by the MEC system provider and/or by a third-party; how may the MEC system provide information to MEC apps in EMEC about the availability of MEC apps on CMEC devices; how may a CMEC app use services running on other CMEC devices; how may the MEC system interconnect MEC app instances deployed on a CMEC device with other MEC apps on EMEC and/or other CMEC devices; or how to integrate the CMEC devices under the control of the network operator or the third-party service provider.

Feature(s) of the deployment of CMEC, ownership of device edge services, etc. may include hierarchical deployment of EMEC and CMEC, orchestration and management, and/or ownership and/or domain of EMEC and CMEC, for example, a single MEO and MEPM for EMEC and CMEC if EMEC and CMEC are in a single domain and/or separate MEO and MEPM for EMEC and CMEC if EMEC and CMEC are in different domains.

Hierarchical deployment may be provided. In examples, at Telco Edge (e.g., inside a factory floor and/or at a central location in a facility), an MEC platform may be deployed co-located with eNB/AP. The MEC platform may be referred to as EMEC herein.

MEC applications running on EMEC may consolidate, filter, and/or process application data from other ME applications running on CMEC, for example, considering use cases involving ML/FL application. In such a case, Telco Edge applications may play a central role for applications (e.g., certain applications). In examples, EMEC applications may not play a central role. In examples, the EMEC applications may provide service independently to users and/or other MEC applications. CMEC devices may run parts of the main application, which may be running in telco edge. Applications in EMEC may be viewed as central entity[ies] communicating with CMEC devices in a vicinity, which may create a hierarchical notion of an edge deployment. Telco edge may be provided with knowledge of available CMECs and/or applications.

Constrained devices may be equipped with an MEC platform (e.g., referred to as CMEC herein) allowing a framework (e.g., common framework) for application deployment, execution, and/or management. In examples, the MEC platform on a constrained device may have one or more resource limitations. For example, as part of a surveillance application, images may be captured by a robotic eye. The images may be processed at the robot, which may be equipped with a CMEC. A result may be sent to the surveillance application running on the EMEC, for example, after the image is processed at the robot.

MEC apps on CMEC may be capable (e.g., need to be capable) of exchanging information with one or more similar MEC application instances running on other CMEC platforms.

Availability of MEC applications and/or MEC services (e.g., running on CMEC) may vary with time, which may be due to mobility, unavailability of compute resource, and/or system failure. It may be beneficial (e.g., required) to periodically monitor and/or update available MEC apps and/or services on a CMEC platform.

Figure 8:
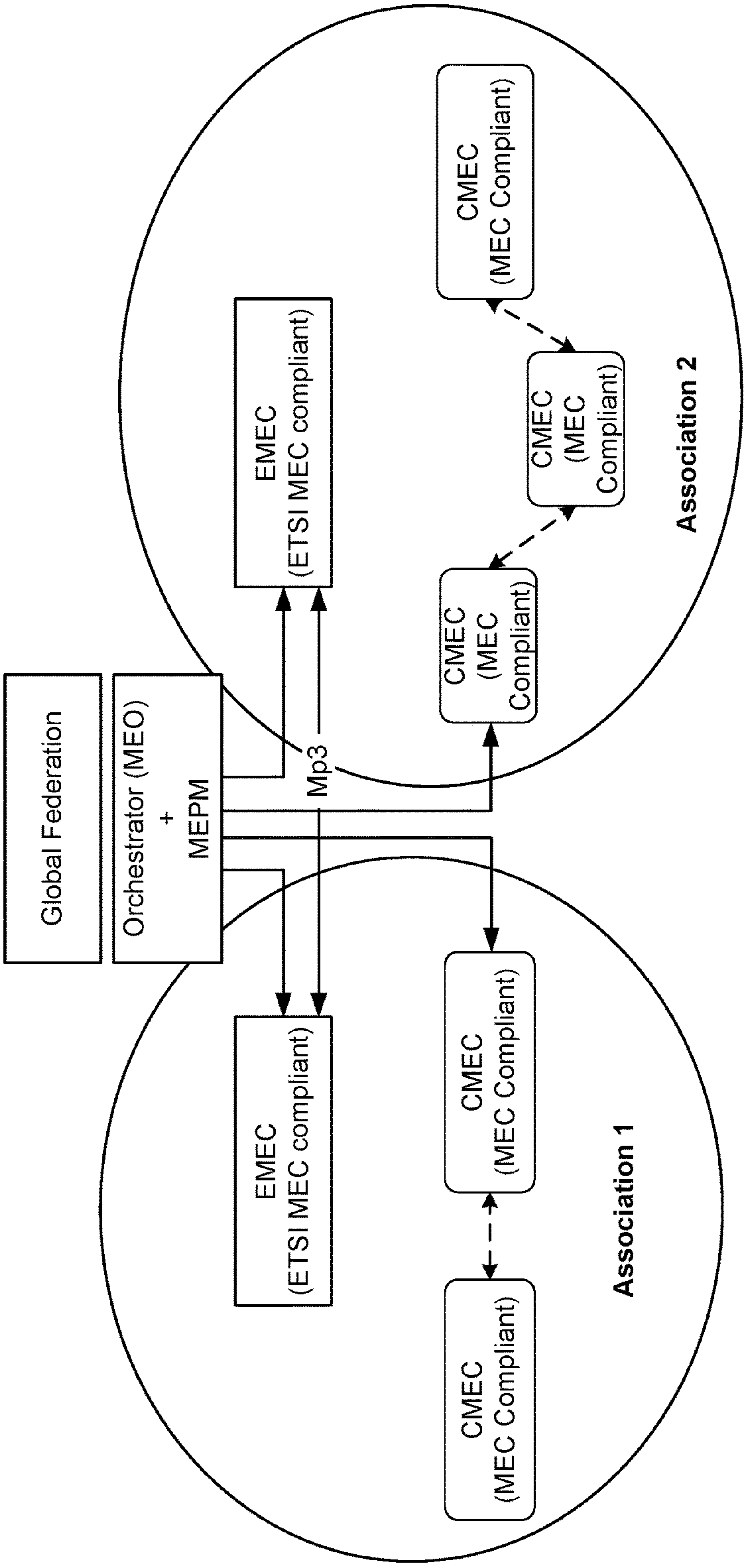
FIG. 8 is a diagram that shows an example combined Edge Multi-access Edge Computing (EMEC) and CMEC system deployment.

FIG. 8 is a diagram that shows an example combined EMEC and CMEC system deployment. In examples, the diagram may show a hierarchical relationship between EMEC and CMEC. A group of EMECs and CMECs may be shown to be associated in a hierarchical manner and may be referred to as "Association 1" and "Association 2". The association may be created by MEO, for example, at the time of deployment.

One or more of the following interfaces may be used in the combined EMEC and CMEC system deployment: EMEC to EMEC; EMEC to CMEC; CMEC to CMEC; orchestrator to EMEC and orchestrator to CMEC; or federation function at a global level (e.g., which may enable EMEC to EMEC interface for inter-MEC system communication.) The EMEC to EMEC interface may be to over an Mp3 interface and may be used for inter-host communication. The EMEC to EMEC interface may be used for inter-system communication (e.g., following the interface Mpp-fed as described herein), for example, if the EMECs are in different MEC systems. The EMEC to CMEC interface and/or platform may include inter-EMEC and CMEC platforms and/or interfaces for application synchronization, federation of CMEC platforms, and/or context management. The CMEC to CMEC interface may include inter-CMEC application synchronization and/or context management. The orchestrator to EMEC and orchestrator to CMEC interface may include an orchestrator (e.g., common orchestrator) responsible for deploying and/or managing MEC apps. Orchestrators deploying to EMEC and CMEC may be aware (e.g., need to be aware) of application requirement(s), for example, where the application may be deployed and interdependency of applications.

Orchestration and/or management may be provided. EMEC may be an MEC platform (e.g., standard MEC platform) managed by an MEC platform manager and/or an MEC orchestrator. CMECs may be managed by an MEC platform manager and/or an MEC orchestrator. The orchestrator may be same as in MEC reference architecture (e.g., MEO). An MEC orchestrator (e.g., single MEC orchestrator) may be responsible for managing EMECs and CMECs, for example, if there is an owner (e.g., single owner) of the MEC system.

Ownership and/or domain may be different for EMEC and CMEC. CMECs may be owned and/or operated by a third-party.

Figure 9:
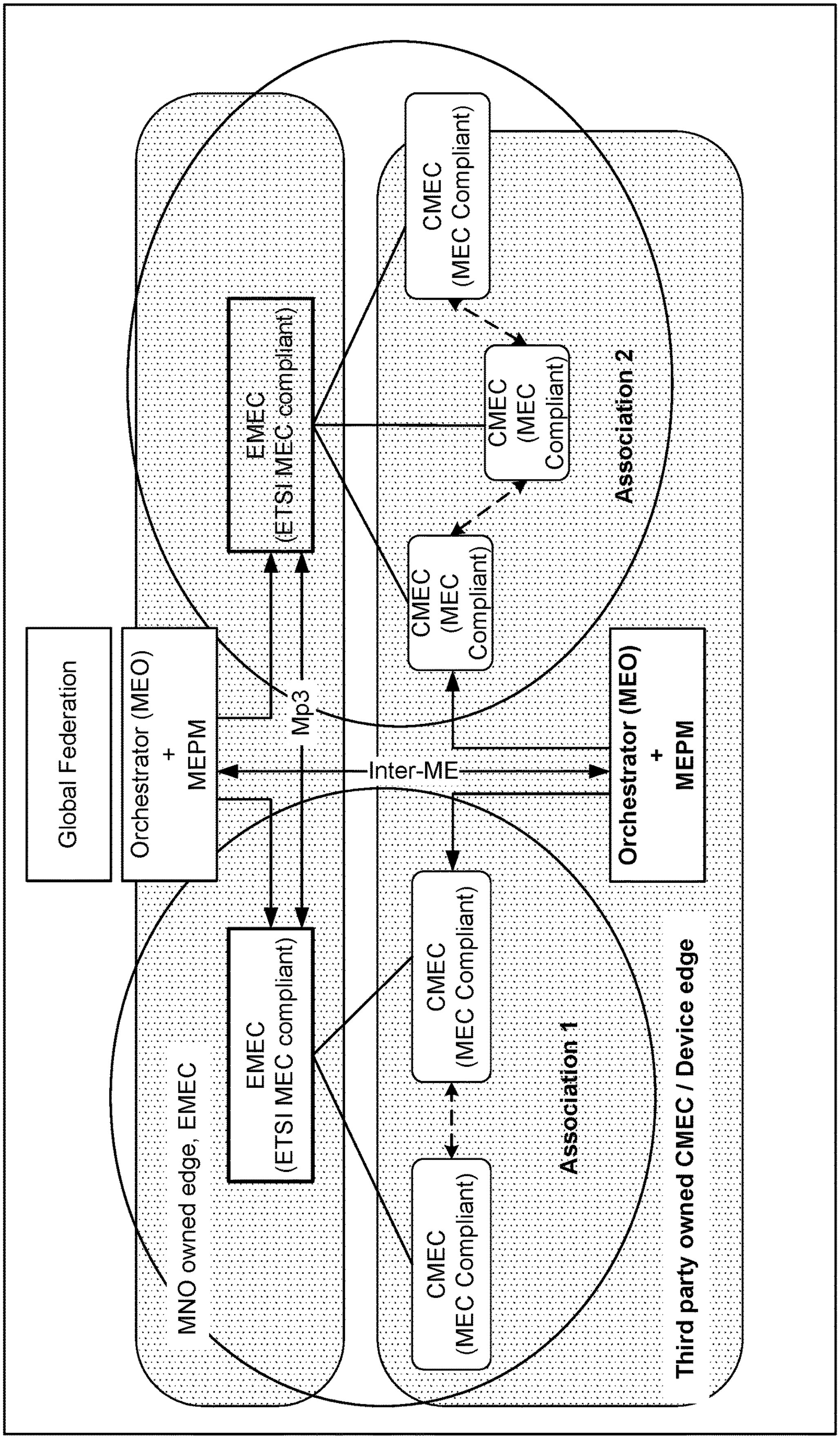
FIG. 9 is a diagram that shows an example CMEC deployment, such as a third-party CMEC deployment.

FIG. 9 is a diagram that shows an example third-party CMEC deployment. In examples, EMECs may be managed by an MNO-owned MEC system and CMECs may be managed by a third-party-owned MEC system. Node(s) may belong to different domains, for example, within an association. The associations (e.g., two associations) may be in a single domain or in different domains.

An MNO-owned MEC system may allow MEC apps running on EMEC to use MEC services running on third party owned CMECs. A WTRU may be allowed to use MEC services running on third-party-owned CMECs.

In the case of third-party deployment of CMECs, it may be at a higher level (e.g., between orchestrators (MEOs) and platform managers (MEPMs)) that information about EMECs and CMECs may be exchanged. An inter-ME interface may be used for information exchange (e.g., as shown in FIG. 9).

Inter-MEC communication (e.g., between an MNO-owned EMEC system and a third-party-owned CMEC system) using inter-MEC interface may be used by a third-party-owned MEC system to provide an MNO-owned MEC system information about available CMECs. EMEC information may be provided to a third-party MEC system.

Method, systems, and/or instrumentalities to integrate CMEC hosts with EMEC may be provided. One or more of the following may be used to integrate CMEC hosts with EMEC: introduce a function LF in EMEC (e.g., the function referred to as LFE herein) and CMEC (e.g., the function referred to as LFC herein), for example, to discover available applications in EMEC and/or CMEC; orchestration and/or deployment of EMEC and CMEC; introduce one or more interfaces between LF entities in EMEC and CMEC, for example, to discover applications MPP-lfe and MPP-cmec (e.g., as shown in FIG. 10); or procedures for EMEC-initiated discovery of application in CMEC, CMEC initiated registration with EMEC to announce availability of applications, and/or CMEC initiation discovery of other CMEC applications.

Introducing one or more interfaces between LF entities in EMEC and/or CMEC, for example, to discover applications MPP-lfe and MPP-cmec may be used to integrate CMEC hosts with EMEC. In examples, the interface(s) may be similar to Mp3 or Mpp-fed in the MEC reference architecture described herein. The interfaces may provide CMEC-specific capabilities as described herein.

Figure 10:
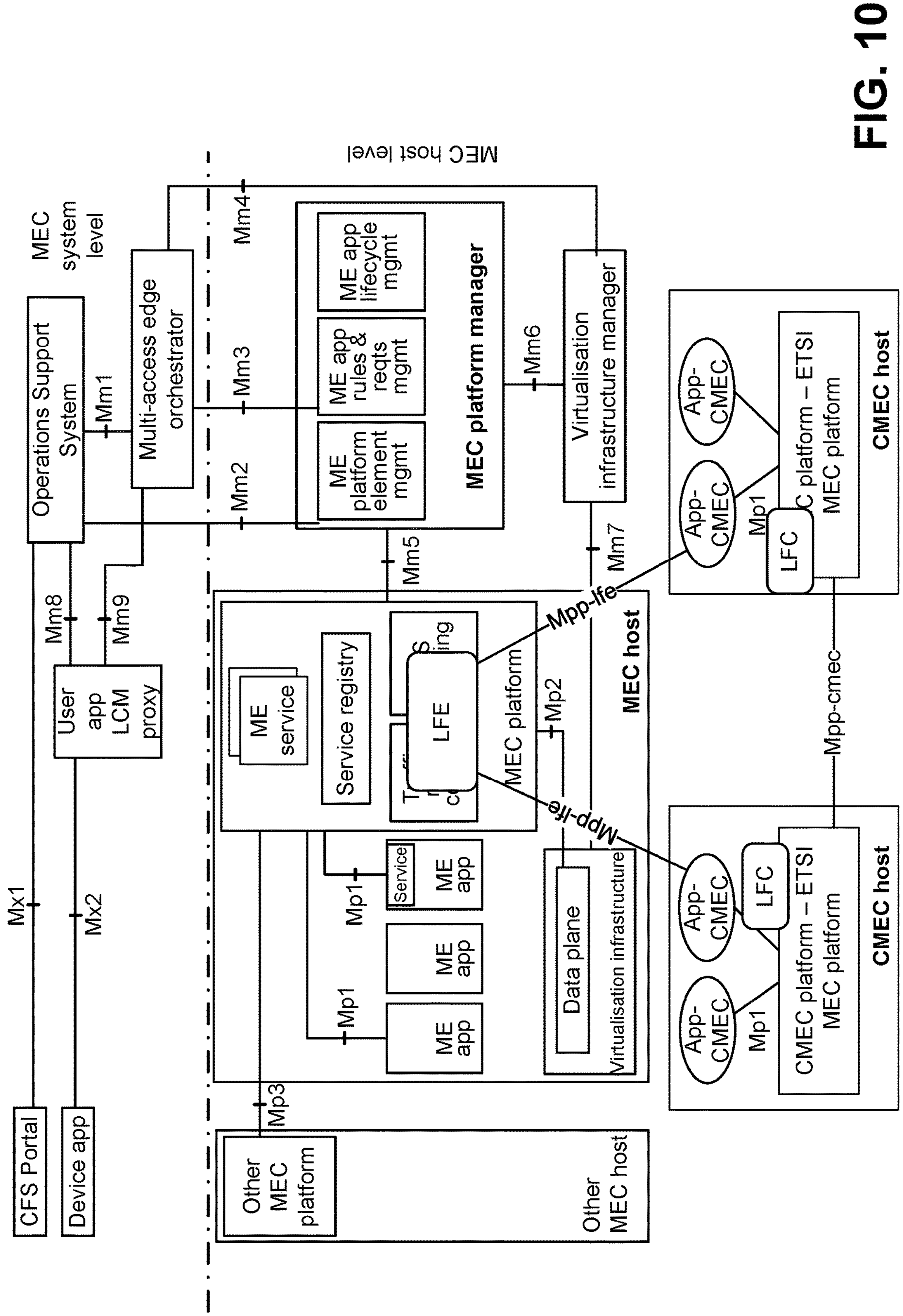
FIG. 10 is a diagram that shows an example high-level CMEC deployment and/or interfaces.

FIG. 10 is a diagram that shows an example high-level CMEC deployment and interfaces. A local federation function may be provided. In examples, the federation function at local level (e.g., local federation in EMEC referred to as LFE) may be used in a MEC system. LFE may support multiple functions such as one or more of the following. The LFE may act as a discovery agent/broker and may gather information about applications available in CMEC. The LFE may support a function that obtains from MEO a list of available CMECs and/or information to reach the CMECs. LFE may support a function that discovers available MEC apps and/or services running on CMEC. LFE may support a function that maintains a registry of MEC apps and services running on CMEC. LFE may support a function that makes the list of applications (e.g., MEC apps) and/or services in CMECs available to an application requesting it via Mp1. The listed functions may be described herein. The listed functions (e.g., functions that the LFE may support) may be extended to add more functions such as one or more of the following: triggering MEC app and service deployment in CMEC, for example, based on MEC app request and/or maintaining session continuity as CMECs move and/or disappear.

A function may be in CMEC (e.g., referred to as local federation in CMEC (LFC)). LFC may support one or more of the following functions in CMEC: obtains and/or maintains a list of entry points of other LF functions in EMEC and/or CMEC; gathers MEC app information in CMEC and/or provides the MEC app information, for example, on a request to EMEC; or public MEC apps (e.g., MEC apps running in CMEC) to EMEC.

Figure 11:
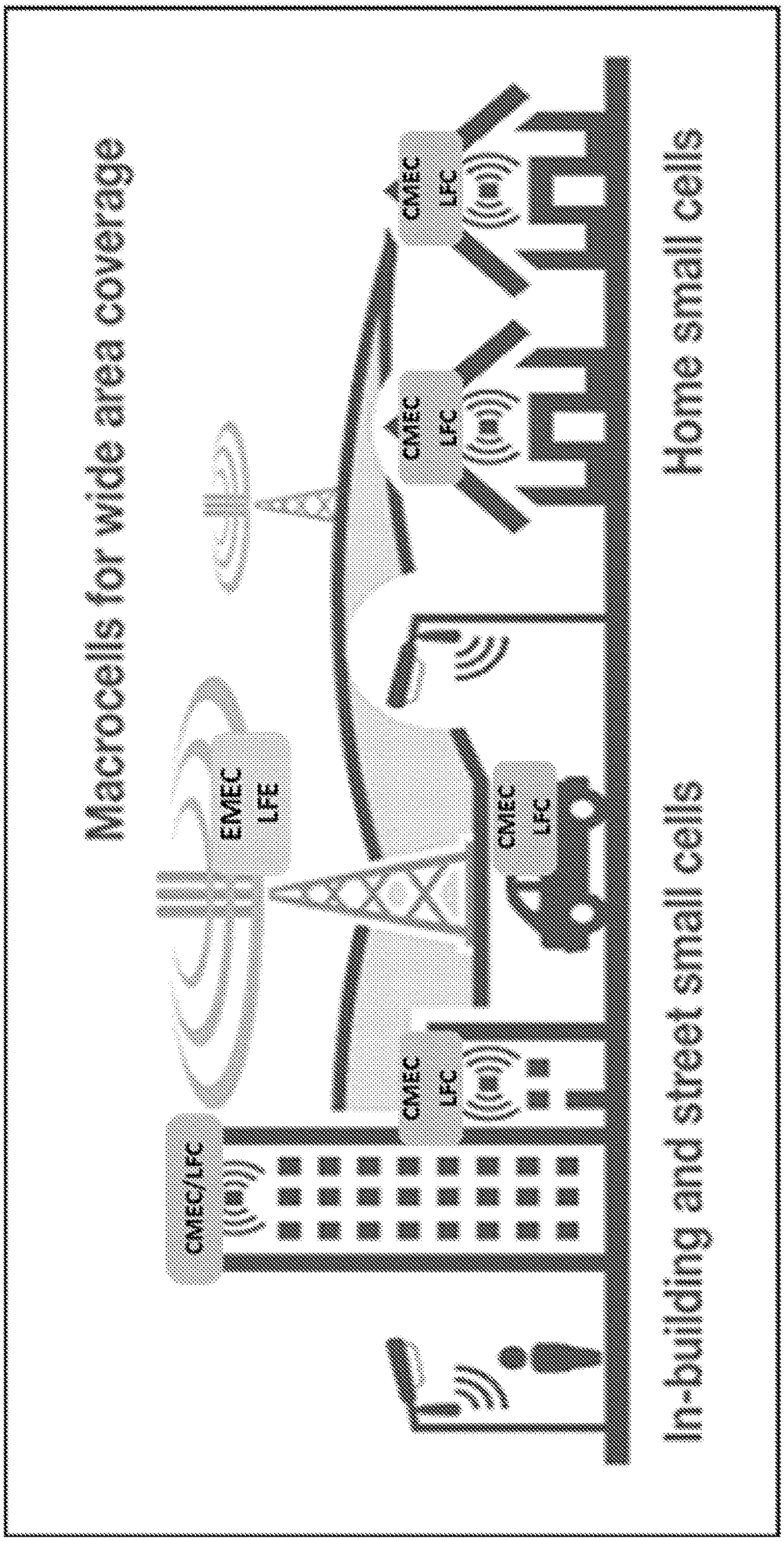
FIG. 11 is a diagram that shows an example local federation in EMEC (LFE) and local federation in CMEC (LFC) deployment.

FIG. 11 is a diagram that shows an example EMEC LFE and CMEC LFC deployment. LFE and LFC may be functional entities and may be co-located with EMEC and CMEC, respectively. A deployment scenario may be provided.

Sensors, I/O devices, and/or cameras may be installed within a building. In examples, the devices may be equipped with CMEC capability (e.g., as described herein).

Figure 12:
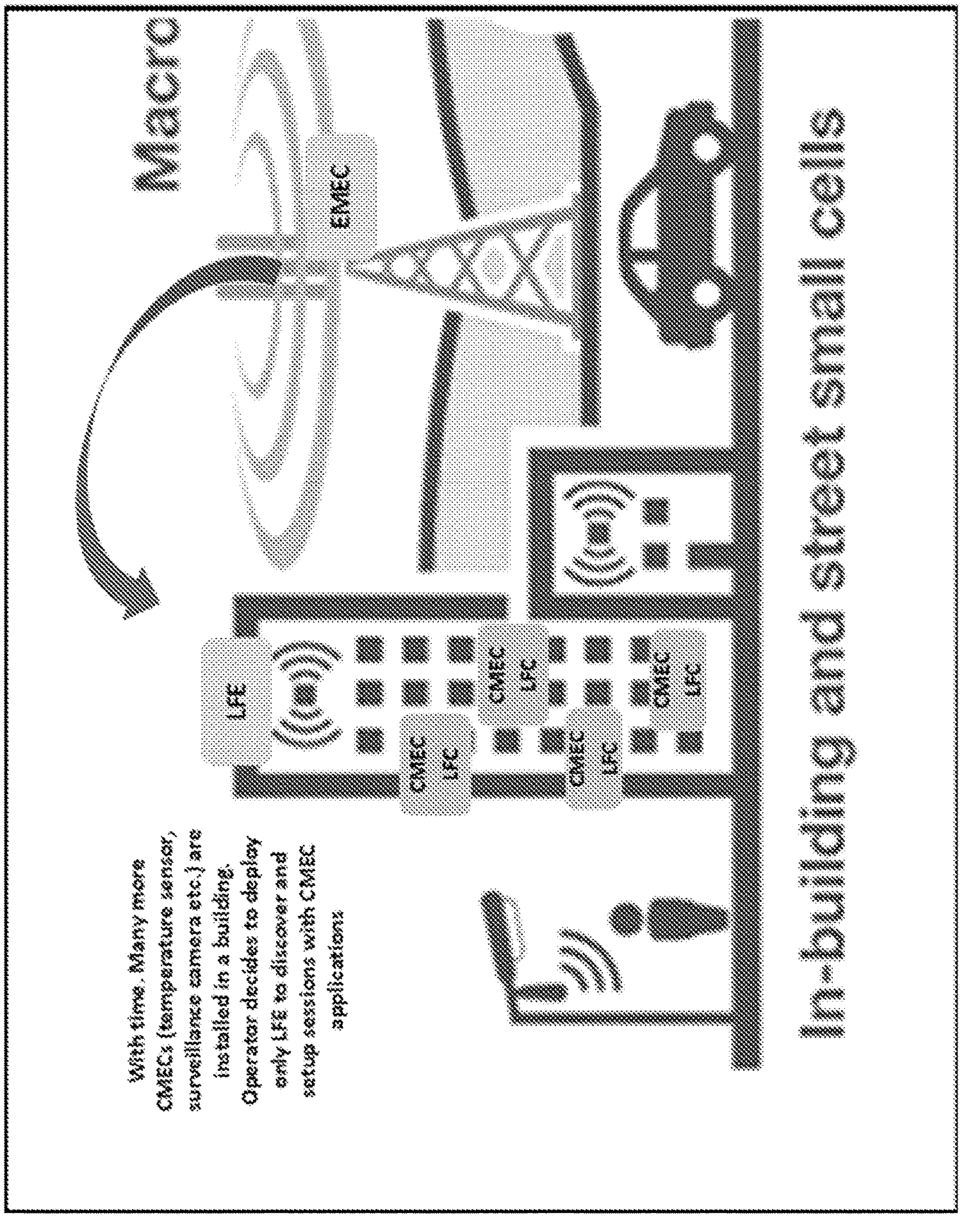
FIG. 12 is a diagram that shows an example of LFE.

FIG. 12 is a diagram that shows an example evolution of LFE. In examples, in a deployment scenario, a LFE function may be moved to a location (e.g., a central location) in a building. LFE function may be deployed on a cell (e.g., a small cell) inside the building, for example, which may be useful to discover localized MEC apps (e.g., more localized MEC apps) running on CMECs and getting access to a local network inside the building. LFE may discover MEC apps running on CMECs and may report back to EMEC in a Macro network.

Orchestration may be provided. In examples, a MEC orchestrator (e.g., a single MEC orchestrator) may be responsible for managing EMECs and/or CMECs. There may be differences with respect to an interface between MEO and CMEC, such as one or more of the following: an MEO may be aware of CMECs and may deploy MEC applications suitable for the CMECs and/or an MEO may be aware of dependency of MEC applications among EMEC and CMECs. Based on the dependency, the MEO may deploy MEC applications in a given area which may include EMEC and CMEC.

Figure 13:
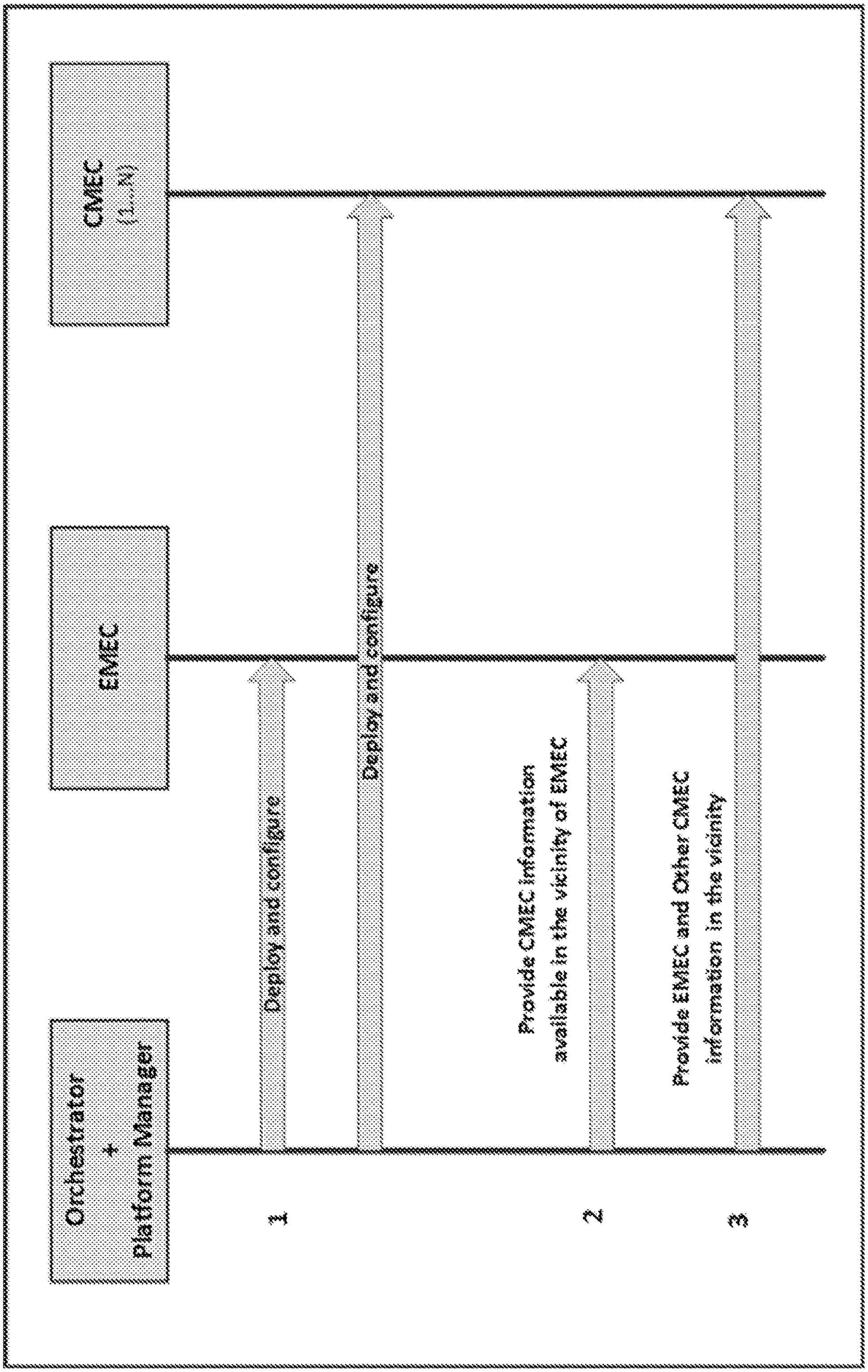
FIG. 13 is a diagram that shows an example orchestration (e.g., an initial orchestration of EMEC and CMEC).

FIG. 13 is a diagram that shows an example initial orchestration of EMEC and CMEC. In 1, a MEO may deploy EMEC and/or CMEC platforms. Platform manager (MEPM) may provide configuration information to the EMEC and/or CMECs over an Mm5 interface. For example, configuration information sent by the MEPM to EMEC and/or CMEC may include traffic rules, DNS rules, etc. In 2, the MEO may provide the EMEC with information on available CMECs (e.g., all available CMECs) and a list of available entry points for the CMEC (e.g., each CMEC). The entry point may be a uniform resource identifier (URI) of a CMEC LFC. The information may be sent over an Mm3 interface from MEO to MEPM. MEPM may send the information to EMEC over Mm5 interface. Mm3 may be a standard interface and may be extended (e.g., may need to be extended) with the information exchange. Mm5 (e.g., which is not specified) may be left open.

MEPM may share a list of EMECs and associated CMECs in proximity (e.g., eMECInfoList).

TABLE 1 eMECInfoList data type

| Attribute name | Data type | Cardinality | Description |
|---|---|---|---|
| eMECInfoList | Structure (inlined) | 0 . . . N | List of EMECs and associated CMECs. |
| >eMECId | String | 1 | Identifier of the EMEC. This attribute may be unique. |
| >cMECInfoList | Structure (inlined) | 0 . . . N | List of available CMECs in the vicinity of EMEC. |
| >>cMECId | String | 1 | Identifier of the CMEC. This attribute may be unique. |
| >>cMECName | String | 1 | Name of the CMEC. This attribute may be unique. |
| >>IFCUri | URI | 1 | Address of the exposed interface. |
| >>interface | Structure (inlined) | 1 | Details to use the interface Mpp-Ife |
| >> >transport | String | 1 | E.g., IP transport, Ethernet or Msg Bus etc. |
| >>> auth | Structured (inline) | 1 | Authentication information to access the interface |

MEO/MEPM may send an update message to EMEC LFE, for example, if the EMEC LFE wants to update a list of available CMECs.

In 3, a MEPM may provide information to a CMEC, for example, about an entry point for a EMEC and/or other available CMECs. The entry point may be a URI of an LFE and/or an LFC. CMEC may trigger discovery of other MEC apps running on other CMECs deployed in a geographical vicinity. In examples, the discovery may involve a CMEC LFC, which may be described herein. LFC may facilitate inter-CMEC communication/information exchange, for example, through the discovery.

In the case of third-party deployment of CMECs, it may be at a higher level (e.g., between MEOs and MEPMs) that information about EMECs and CMECs may be exchanged. Inter-ME interface may be used for information exchange. In examples, to enable the exchange, one or more of the following features may be involved (e.g., required): inter-MEC communication (e.g., between MNO-owned MEC system and third-party-owned MEC system) may be involved to enable the exchange, which may use an inter-MEC interface as described herein. The third-party owned MEC system may provide information about available CMECs and entry point for the CMECs' LFC to the MNO-owned MEC system. EMEC information, for example about an entry point for LFE, may be provided to a third-party MEC system. To enable the exchange, the following feature may be involved (e.g., required): MEPM on the MNO side may provide information to an EMEC about third party CMECs and entry point(s) for LFC, for example, which may be authenticated and/or allowed (e.g., only authenticated and/or allowed) to be accessed with security credentials.

One or more of the following similarities may be identified, for example, if comparing with the embodiments described herein. In examples, an inter-MEC interface may be compared with Mff-fed and Meo-fed described herein. The embodiments for the interfaces in MEC 035 may not be applicable. The interface may be extended (e.g., need to be extended) to include information about CMECs (e.g., one or more possible associative groups of EMECs and CMECs), for example, which may not be elaborated on herein. Mpp-lfe may be similar to Mpp-fed. Mpp-lfe may be enhanced (e.g., need to be enhanced) to include CMEC information. For example, the possibility of CMECs being owned and operated by third-party service providers may use (e.g., need) a standardized Mpp-lfe and Mpp-cmec interface.

Interface between local federation functions (e.g., LFE and LCE) may be provided. One more of the following interfaces may be described herein: Mpp-lfe (e.g., between LFE and LFC) or Mpp-cmec (e.g., between LFCs). For Mpp-lfe, an EMEC may discover MEC apps and/or services in CMEC. A CMEC may provide a list of available MEC apps and/or MEC services to EMEC. For Mpp-cmecm, CMECs may discover other CMEC MEC apps available.

EMEC-initiated CMEC Application discovery may be provided. In examples, MEC apps in CMEC may be independent functions and/or may act as supporting functions to other MEC apps running on EMEC and/or CMEC. The MEC apps in CMEC may act as service producers, for example, by registering with CMEC platform using an Mp1 interface. EMEC may initiate discovery to find out available MEC apps in CMEC. The discovery may be triggered, for example, at the time of initial deployment and/or by a MEC app running in EMEC. The discovery may be initiated by an LFE function using a Mpp-lfe interface. The discovery may take place between LFE and LFC. LFE may have the URI to reach LFC in CMEC. In examples, the discovery (e.g., the same discovery) may be repeated with more than one LFCs.

Figure 14:
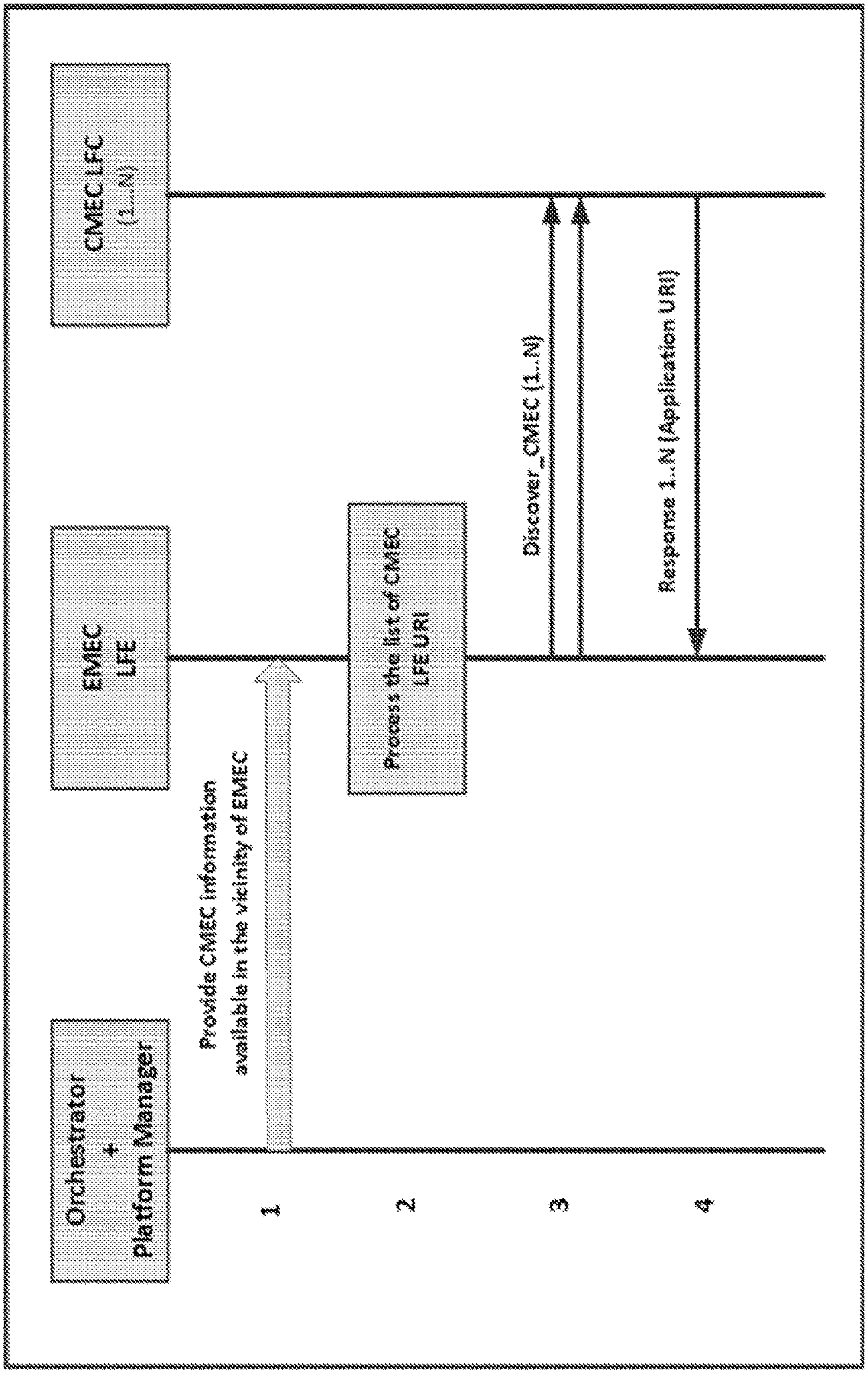
FIG. 14 is a diagram that shows an example CMEC application discovery.

FIG. 14 is a diagram that shows an example CMEC application discovery. In 1 (e.g., which may be similar to 2 described in FIG. 13), MEO and MEPM may provide a list of available CMECs in the vicinity of EMEC (e.g., eMECInfoList). The EMEC may parse the list and/or may select an information element related to the EMEC. In the element, cMECInfoList may include information related to available CMECs.

TABLE 2

| cMECInfoList data type | | | |
|---|---|---|---|
| Attribute name | Data type | Cardinality | Description |
| cMECInfoList | Structure (inlined) | 0 . . . N | List of available CMECs in the vicinity of EMEC. |
| >cMECId | String | 1 | Identifier of the CMEC. |
| >cMECName | String | 1 | Name of the CMEC. This attribute may be unique. |
| >IFCUri | URI | 1 | Address of the exposed interface. |
| >interface | Structure (inlined) | 1 | Details to use the interface Mpp-lfe |
| >> transport | String | 1 | Types of transport such as IP, Ethernet, Msg bus etc. |
| >> auth | Structured (inline) | 1 | Authentication information to access the interface |

In 2, EMEC LFE may process the list of CMEC LFE URI. The EMEC LFE may store the list. In examples, the list may include one or more of the following: CMEC ID, CMEC NAME, CMEC LFE URI, or interface details. In 3, EMEC LFE may start sending one or more discovery messages to the CMECs (e.g., all the CMECs). The discovery message(s) may be sent over an interface (e.g., MPP-lfe, which may be similar to Mpp-fed or extension of Mp3). The discovery may include the EMEC LFE sending GET (e.g., ../../status/cmecAPPList).

TABLE 3

| cmecAppList data type/attributes | | | |
|---|---|---|---|
| Attribute name | Data type | Cardinality | Description |
| >cMECId | String | 1 | Identifier of the CMEC. This attribute may be unique. |
| >cMECName | String | 1 | Name of the CMEC. This attribute may be unique. |
| >appService-Produced | Service Descriptor | 0 . . . N | Describes list of services in CMEC |

In 4, CMEC LFE may respond with 200 OK and/or with the message body including cmecAppList and validityTime.

TABLE 3

| 200 ok msg body attributes | | | |
|---|---|---|---|
| Attribute name | Data type | Cardinality | Description |
| >cMECId | String | 1 | Identifier of the CMEC. This attribute may be unique. |

TABLE 3-continued

| 200 ok msg body attributes | | | |
|---|---|---|---|
| Attribute name | Data type | Cardinality | Description |
| >cMECName | String | 1 | Name of the CMEC. This attribute may be unique. |
| >appServiceProduced | Service Descriptor | 0 . . . N | Describes list of services in CMEC |
| >cMECLocation | LocationConstraints | 1 | Geo location, city, zone etc. As described in Table 4 |
| >validityTime | Integer | 0 . . . 1 | Indicates how long the registration may be valid. |

TABLE 4

| Extension to the Location Constraints data type | | | |
|---|---|---|---|
| Attribute name | Data type | Cardinality | Description |
| countryCode | String | 0 . . . 1 | The two-letter (e.g., ISO 3166) country code in capital letters. May be present in case the "area" attribute is absent. May be absent if the "area" attribute is present |
| civicAddressElement | Array (Structure inlined) | 0 . . . N | Zero or more elements comprising the civic address. May be absent if the "area" attribute is present. |
| area | Polygon | 0 . . . 1 | Geographic area. |
| mECLocation | LocationInfo | 1 | Location of the MEC |
| accessPointID | String | 0 . . . N | The identity of the point of attachment of the MEC to the local networks an ApIdentity, and/or identifiers like the Ecgi and NRcgi. |

In 4a, CMEC LFE may UPDATE/DELETE the "cmecAppList" by sending POST (e.g., ../status/cmecAppList) to EMEC LFE. EMEC LFE may re-do the process to update a stored list of CMEC MEC app Services, for example, if the validity time of CMEC services expires.

CMEC registering with EMEC may be provided.

Figure 15:
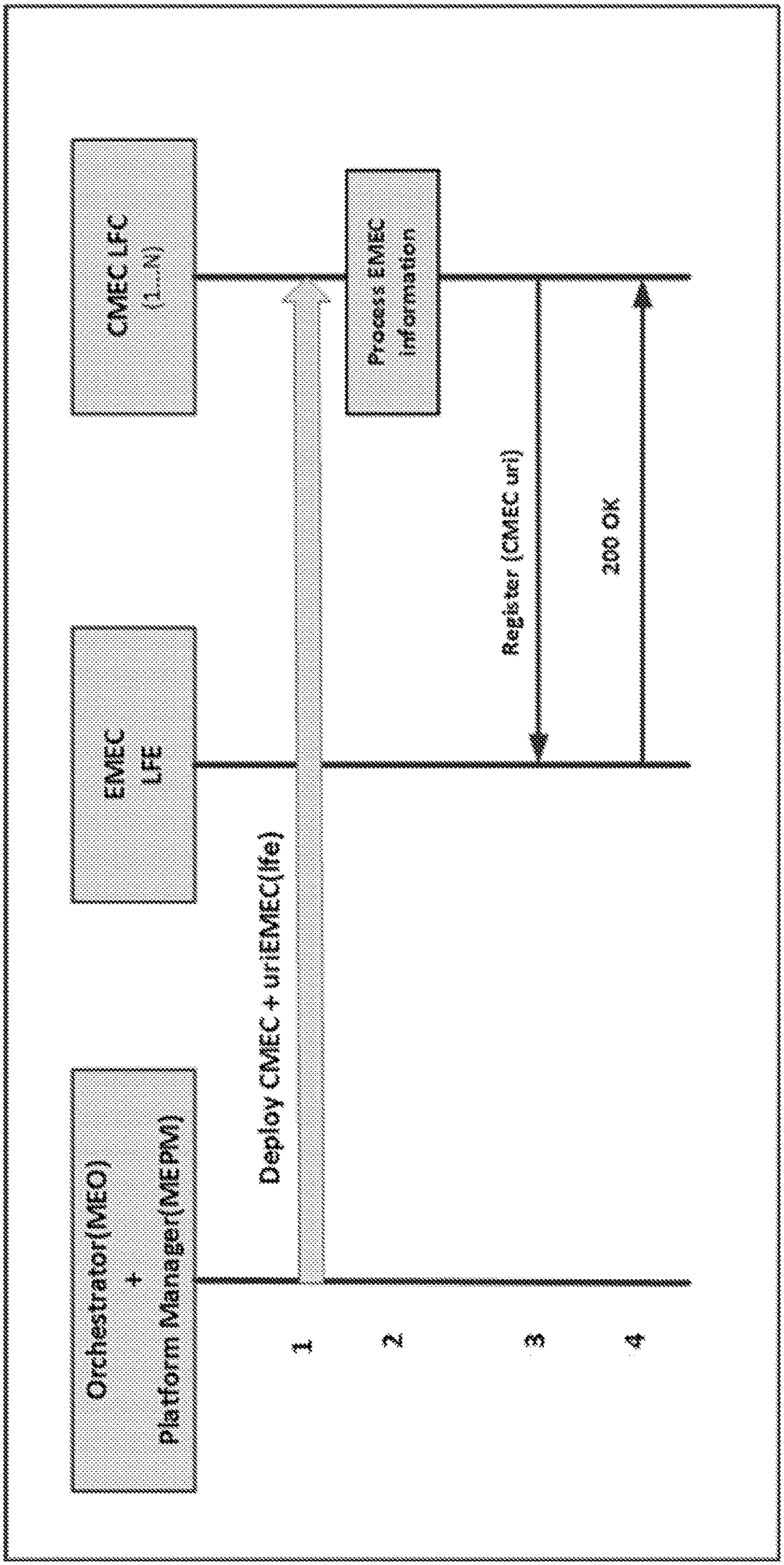
FIG. 15 is a diagram that shows an example CMEC registration.

FIG. 15 is a diagram that shows an example CMEC registration. An orchestrator may comprise a list of the CMEC LFC integrated in the MEC system. In 1, the orchestrator may deploy CMEC and/or CMEC-LFC function. The orchestrator may provide EMEC LFE URI information to the CMEC-LFC function, for example, via a message body including Post../EMEC LFE information (e.g., similar to examples described herein). The orchestrator may provide EMEC LFE information (e.g., suitable EMEC LFE information) to the CMEC LFC, for example, by sending a message with emecLfeInformation attributes.

TABLE 5

| emecLfeInformation attributes | | | |
|---|---|---|---|
| Attribute name | Data type | Cardinality | Description |
| >eMECId | String | 1 | Identifier of the EMEC. This attribute may be unique. |
| >IFEUri | URI | 1 | Address of the exposed interface. |
| >eMECLocation | Location-Constraints | 1 | Geo location, city, zone etc. As described in Table 4 |
| >interface | String | 1 | IP, Ethernet or Message Bus |

In 2, processing and/or storing the EMEC LFE information may be provided. In 3, the CMEC LFC may register with the EMEC LFE (e.g., LFE URI sent to CMEC LFC by the orchestrator) and may provide cMECRegistrationUpdate to the EMEC (e.g., Post../cmec_registration).

TABLE 6

| cMECRegistrationUpdate structure | | | |
|---|---|---|---|
| Attribute name | Data type | Cardinality | Description |
| >cMECId | String | 1 | Identifier of the CMEC. This attribute may be unique. |
| >cMECLocation | Location-Constraints | 1 | Geo location, city, zone etc. As described in Table 4 |
| >appService-Produced | Service Descriptor | 0 . . . N | Describes list of services in CMEC |
| >validityTime | Integer | 0 . . . 1 | Indicates how long the registration may be valid. |

In examples, the CMEC may provide EMEC the CMEC's location, CMEC ID, description of list of services in CMEC and/or validity time of the CMEC. In examples, the validity time may be dependent on one or more of the following: power status (e.g., power saving policy of the CMEC), mobility pattern, security policy, or available resources in the CMEC (e.g., compute and/or network resources). In 4, the EMEC may respond with 200 OK. The 200 OK response may imply that EMEC may provide the list of CMEC services to an application trying to discover CMEC services, for example, if the 200 OK response is sent to the CMEC.

CMEC's discovering other CMEC applications may be provided.

Figure 16:
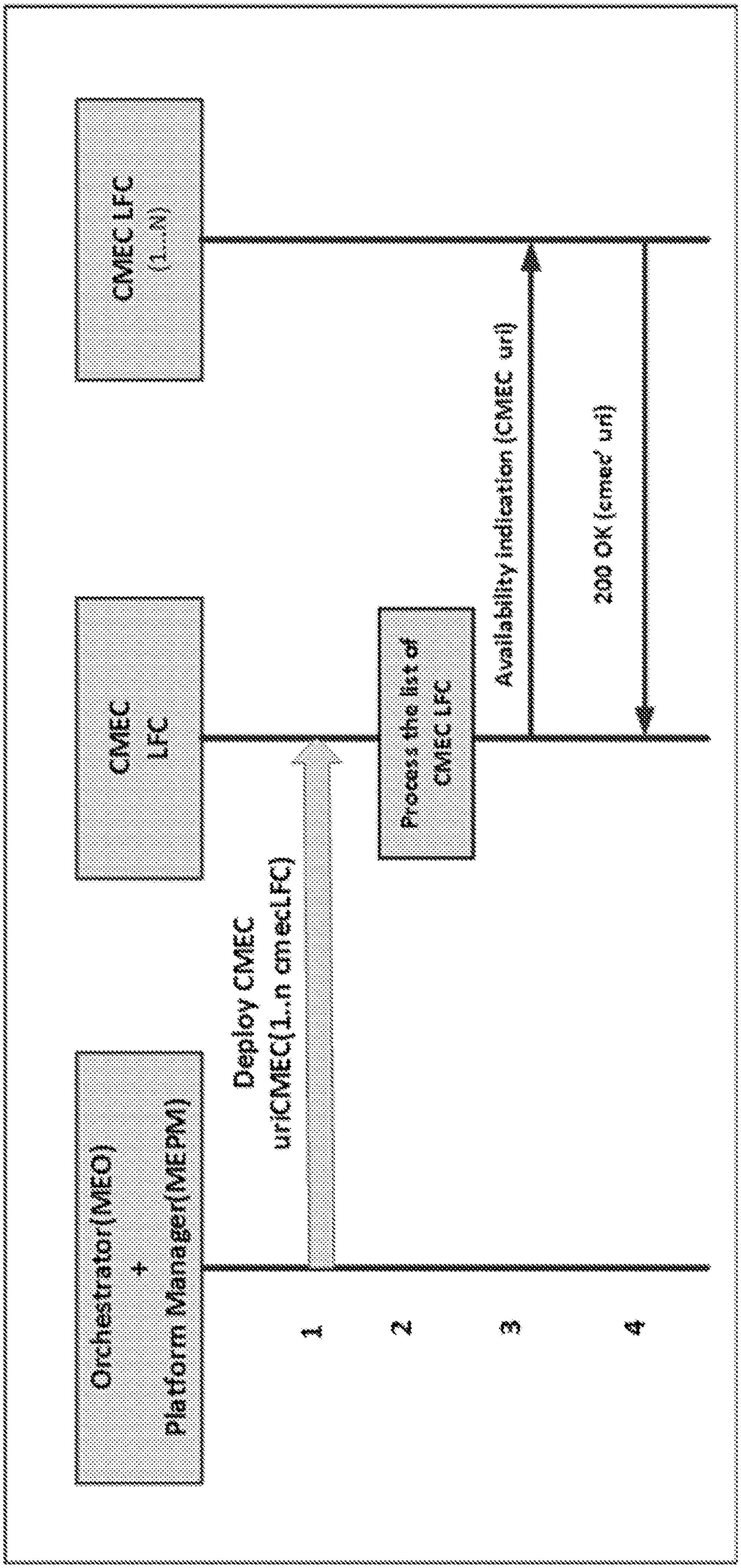
FIG. 16 is a diagram that shows an example CMEC to CMEC application discovery.

FIG. 16 is a diagram that shows an example CMEC to CMEC application discovery. In 1, an orchestrator, e.g., while deploying CMEC, may provide a list of available CMECs in proximity (e.g., similar examples described herein). The information element being sent may be provided (e.g., Post../cmecLfcList Information).

TABLE 6

| cmecLfcList Information attributes | | | |
|---|---|---|---|
| Attribute name | Data type | Cardinality | Description |
| cmecLfcList | List | 1 | Contains a list of available CMECs |
| >cMECId | String | 1 | Identifier of the CMEC. This attribute may be unique. |
| >cMECLocation | Location-Constraints | 1 | Geo location, city, zone etc. As described in Table 4 |
| >IFCUri | URI | 1 | Address of the exposed interface. |

In 2, a list of neighboring CMEC LFC(s) from the orchestrator MEO and/or MEPM may be processed and/or stored at the CMEC for the application discovery. In 3, the initiating CMEC may send an availability query to the CMEC LFCs from the processed list (e.g., GET../cmecAppAvailable).

TABLE 7

| cmecAppAvailable attributes | | | |
|---|---|---|---|
| Attribute name | Data type | Cardinality | Description |
| >cMECId | String | 1 | Identifier of the CMEC to which the query is sent. |
| >IFCUri | URI | 1 | Address of LFC to which query is sent. |
| >cMECLocation | Location-Constraints | 1 | Geo location, city, zone etc of the queried CMEC |
| >cMECAppList | Array (Structured Inline) | 1 . . . N | Provides list of applications hosted in the queried CMEC |

In 4, a target CMEC depending on the availability may respond with 200 OK with the message body including the attributes.

TABLE 8

| 200 OK msg body attributes | | | |
|---|---|---|---|
| Attribute name | Data type | Cardinality | Description |
| >cMECId | String | 1 | Identifier of the CMEC. |
| >IFCUri | URI | 1 | Address of the exposed interface. |
| >cMECLocation | LocationConstraints | 1 | Geo location, city, zone etc. |
| >cMECAvailability | Boolean | 0 . . . 1 | Provides indication if the CMEC is available to provide services to the querying CMEC. |

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, Previously Presented Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

What is claimed:

1. A first wireless transmit/receive unit (WTRU), the first WTRU comprising:

a processor, the processor configured to:

receive a first message from a network node, wherein the first message from the network node indicates communication information to be used to communicate with a second WTRU, and wherein the communication information indicates a list of one or more device interfaces associated with an application;

select, from the list of one or more device interfaces, a device interface to be used to communicate with the second WTRU, wherein the second WTRU is associated with the application;

send a first message to the second WTRU using the selected device interface, wherein the first message to the second WTRU indicates a service discovery request;

receive a second message from the second WTRU, wherein the second message from the second WTRU indicates a service provided by the second WTRU and indicates a service identifier, wherein the service identifier is associated with the service;

send a third message to the second WTRU, wherein the third message to the second WTRU indicates the service identifier, and wherein the third message includes data for the service;

generate a list of available WTRUs using the first message from the network node, wherein the list of available WTRUs is associated with the communication information, and wherein the list of available WTRUs includes the second WTRU; and send a first message to a third WTRU, wherein the list of available WTRUs includes the third WTRU, and wherein the first message to the third WTRU indicates the second WTRU and the communication information.

2. The first WTRU of claim 1, wherein the communication information is based on registration information associated with the second WTRU.

3. The first WTRU of claim 1, wherein the service identifier is used to access the service, and wherein the service identifier is a uniform resource identifier (URI).

4. The first WTRU of claim 1, wherein a location of the first WTRU is associated with a geographic area.

5. The first WTRU of claim 1, wherein the first WTRU is associated with an Edge Multi-access Edge Computing (EMEC) system, and wherein the second WTRU is associated with a Constrained Multi-access Edge Computing System (CMEC).

6. The first WTRU of claim 4, wherein a location of the second WTRU is associated with the geographic area.

7. The first WTRU of claim 2, wherein the service identifier is used to access the service, and wherein the service identifier is a uniform resource identifier (URI).

8. A method performed by a first wireless transmit/receive unit (WTRU), comprising:

receiving a first message from a network node, wherein the first message from the network node indicates communication information to be used to communicate with a second WTRU, and wherein the communication information indicates a list of one or more device interfaces associated with an application;

selecting, from the list of one or more device interfaces, a device interface to be used to communicate with the second WTRU, wherein the second WTRU is associated with the application;

sending a first message to the second WTRU using the selected device interface, wherein the first message to the second WTRU indicates a service discovery request;

receiving a second message from the second WTRU, wherein the second message from the second WTRU indicates a service provided by the second WTRU and indicates a service identifier, wherein the service identifier is associated with the service;

sending a third message to the second WTRU, wherein the third message to the second WTRU indicates the service identifier, and wherein the third message to the second WTRU includes data for the service;

generating a list of available WTRUs using the first message from the network node, wherein the list of available WTRUs is associated with the communication information, and wherein the list of available WTRUs includes the second WTRU; and sending a first message to a third WTRU, wherein the list of available WTRUs includes the third WTRU, and wherein the first message to the third WTRU indicates the second WTRU and the communication information.

9. The method of claim 8, wherein the communication information is based on registration information associated with the second WTRU.

10. The method of claim 8, wherein the service identifier is used to access the service, and wherein the service identifier is a uniform resource identifier (URI).

11. The method of claim 8, wherein a location of the first WTRU is associated with a geographic area.

12. The method of claim 11, wherein a location of the second WTRU is associated with the geographic area.

13. The method of claim 8, wherein the first WTRU is associated with an Edge Multi-access Edge Computing (EMEC) system, and wherein the second WTRU is associated with a Constrained Multi-access Edge Computing System (CMEC).

14. The method of claim 9, wherein the service identifier is used to access the service, and wherein the service identifier is a uniform resource identifier (URI).

* * * * *